(12) United States Patent
Kiyoshige

(10) Patent No.: US 11,330,524 B2
(45) Date of Patent: May 10, 2022

(54) WIRELESS COMMUNICATION TERMINAL, WIRELESS COMMUNICATION SYSTEM, WIRELESS COMMUNICATION METHOD, AND RECORDING MEDIUM

(71) Applicant: OLYMPUS CORPORATION, Hachioji (JP)

(72) Inventor: Ryuichi Kiyoshige, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/123,167

(22) Filed: Dec. 16, 2020

(65) Prior Publication Data

US 2021/0105723 A1 Apr. 8, 2021

Related U.S. Application Data

(63) Continuation of application No. PCT/JP2018/023247, filed on Jun. 19, 2018.

(51) Int. Cl.
*H04W 52/02* (2009.01)

(52) U.S. Cl.
CPC ... *H04W 52/0235* (2013.01); *H04W 52/0219* (2013.01); *H04W 52/0258* (2013.01)

(58) Field of Classification Search
CPC ......... H04W 52/0235; H04W 52/0219; H04W 52/0258
See application file for complete search history.

(56) References Cited

U.S. PATENT DOCUMENTS 6,922,547 B2 *  7/2005  O'Neill ............. H04W 72/0413
                                              455/17
8,576,760 B2 * 11/2013  Gorokhov ......... H04W 52/0216
                                              370/311

(Continued)

FOREIGN PATENT DOCUMENTS

JP    2010-524278 A    7/2010
JP    2011-223419 A   11/2011

(Continued)

OTHER PUBLICATIONS

International Search Report dated Aug. 21, 2018, issued in counterpart International Application No. PCT/JP2018/023247 (4 pages, including Japanese original and English translation).

*Primary Examiner* — Huy D Vu
*Assistant Examiner* — Bailor C. Hsu
(74) *Attorney, Agent, or Firm* — WHDA, LLP

(57) ABSTRACT

In a wireless communication terminal, a processor is configured to execute sleep determination when a wireless communicator receives a sleep-declaration packet from a sleep-declaration terminal. The processor is configured to determine that sleep by the sleep-declaration terminal is accepted if an upper-rank terminal in a wake-up state other than the sleep-declaration terminal is present. The processor is configured to determine that the sleep by the sleep-declaration terminal is not accepted in the first sleep determination if the upper-rank terminal in the wake-up state other than the sleep-declaration terminal is not present. The processor is configured to cause the wireless communicator to transmit a sleep-prohibition packet to the sleep-declaration terminal when the processor determines that the sleep by the sleep-declaration terminal is not accepted.

11 Claims, 23 Drawing Sheets

(56) References Cited

U.S. PATENT DOCUMENTS

| | | | | |
|---|---|---|---|---|
| 8,670,362 | B2* | 3/2014 | Sun | H04W 52/0216 |
| | | | | 370/311 |
| 9,173,224 | B2* | 10/2015 | Cai | H04W 52/0219 |
| 9,565,637 | B2* | 2/2017 | Tran | H04W 28/0221 |
| 2005/0141499 | A1* | 6/2005 | Ma | H04L 41/0631 |
| | | | | 370/389 |

FOREIGN PATENT DOCUMENTS

| WO | 2008/110801 A2 | 9/2008 |
|---|---|---|
| WO | 2016/189933 A1 | 12/2016 |
| WO | 2016/194204 A1 | 12/2016 |

* cited by examiner

FIG. 5A

| COMMUNICATION PATH | ADJACENT | UPPER RANK | SAME RANK | LOWER RANK |
|---|---|---|---|---|
| 1<br>2→1<br>2→3→1<br>2→4→1<br>1→2→1<br>1→3→1<br>⋮ | 2<br>3<br>4 | NONE | 2 | 3<br>4 |

FIG. 5B

| COMMUNICATION PATH | ADJACENT | UPPER RANK | SAME RANK | LOWER RANK |
|---|---|---|---|---|
| 2<br>1→2<br>1→3→2<br>1→4→2<br>⋮ | 1<br>3<br>4 | NONE | 1 | 3<br>4 |

FIG. 5C

| COMMUNICATION PATH | ADJACENT | UPPER RANK | SAME RANK | LOWER RANK |
|---|---|---|---|---|
| 1→3<br>2→3<br>1→2→3<br>1→4→3<br>2→1→3<br>2→4→3<br>⋮ | 1<br>2<br>4 | 1<br>2 | 4 | NONE |

FIG. 5D

| COMMUNICATION PATH | ADJACENT | UPPER RANK | SAME RANK | LOWER RANK |
|---|---|---|---|---|
| 1→4<br>2→4<br>1→3→4<br>2→3→4<br>⋮ | 1<br>2<br>3 | 1<br>2 | 3 | NONE |

FIG. 6A

| COMMUNICATION PATH | ADJACENT | UPPER RANK | SAME RANK | LOWER RANK |
|---|---|---|---|---|
| 1<br>2→1<br>2→4→1<br>1→2→1<br>1→3→1<br>: | 2<br>3<br>4 | NONE | 2 | 3<br>4 |

FIG. 6B

| COMMUNICATION PATH | ADJACENT | UPPER RANK | SAME RANK | LOWER RANK |
|---|---|---|---|---|
| 2<br>1→2<br>1→4→2<br>2→4→2<br>: | 1<br>4 | NONE | 1 | 4 |

FIG. 6C

| COMMUNICATION PATH | ADJACENT | UPPER RANK | SAME RANK | LOWER RANK |
|---|---|---|---|---|
| 1→3<br>1→4→3<br>2→1→3<br>2→4→3<br>: | 1<br>4 | 1 | 4 | NONE |

FIG. 6D

| COMMUNICATION PATH | ADJACENT | UPPER RANK | SAME RANK | LOWER RANK |
|---|---|---|---|---|
| 1→4<br>2→4<br>1→3→4<br>2→1→3→4<br>: | 1<br>2<br>3 | 1<br>2 | 3 | NONE |

FIG. 26A

| ID | POSITIONAL RELATIONSHIP | TERMINAL STATE | SLEEP TIME | NON-SUBORDINATION RELATIONSHIP |
|---|---|---|---|---|
| : | : | : | : | : |

FIG. 26B

| ID | POSITIONAL RELATIONSHIP | TERMINAL STATE | SLEEP TIME | NON-SUBORDINATION RELATIONSHIP |
|---|---|---|---|---|
| 0002 | SAME RANK | WAKE-UP | | |
| 0003 | LOWER RANK | SLEEP | NINETY MINUTES | |
| 0004 | LOWER RANK | WAKE-UP | | |

FIG. 26C

| ID | POSITIONAL RELATIONSHIP | TERMINAL STATE | SLEEP TIME | NON-SUBORDINATION RELATIONSHIP |
|---|---|---|---|---|
| 0002 | SAME RANK | WAKE-UP | | 0003 |
| 0003 | LOWER RANK | SLEEP | NINETY MINUTES | |
| 0004 | LOWER RANK | WAKE-UP | | |

WIRELESS COMMUNICATION TERMINAL, WIRELESS COMMUNICATION SYSTEM, WIRELESS COMMUNICATION METHOD, AND RECORDING MEDIUM

The present application is a continuation application based on International Patent Application No. PCT/JP2018/023247 filed on Jun. 19, 2018, the content of which is incorporated herein by reference.

BACKGROUND OF THE INVENTION

Field of the Invention

The present invention relates to a wireless communication terminal, a wireless communication system, a wireless communication method, and a recording medium.

Description of Related Art

A method of collecting information from a distant sensor device having a wireless communication function via a network has been presented. This offers a new use case in a place in which it is difficult to build a conventional network. In such a use case, measures using less electrical power and realizing long-distance wireless communication are often used. Such measures are called the low power wide area (LPWA).

For example, there is a case in which a sensor device having such a wireless communication function is installed for inspection of gas meters for residential use. In residential areas, there are places in which houses are densely built and places in which houses are apart from each other. For example, in the star-type network, it is necessary to install devices functioning as a gateway in a place in which radio waves reach all the sensor devices without being influenced by shielding objects. However, it is difficult to satisfy this condition. On the other hand, in the mesh-type network, it is possible to resolve the problem by installing each sensor device in consideration of the fact that each sensor device communicates with its adjacent sensor device.

In terms of power consumption, in the star-type network, each sensor device can sleep at a timing favorable therefor without being influenced by the other sensor devices. In the mesh-type network, there is a possibility that each sensor device is on the communication path for transmitting data from its adjacent sensor device to a gateway or the like. In such a case, it is necessary to secure a communication path for the sensor device adjacent to each sensor device. Therefore, each sensor device is unable to sleep. Consequently, it is difficult to reduce power consumption in a mesh-type network.

In the multi-hop wireless ad-hoc network disclosed in Japanese Unexamined Patent Application, First Publication No. 2011-223419, the gateway is a parent device and the wireless network has a tree structure. All the terminals in the network are synchronized with their adjacent terminals that are present on the path to the gateway. All the terminals are synchronized with the gateway. The gateway and all the terminals match each of an activation cycle, an activation phase, and an activation period with that of the other terminals and switch between an activated state and a sleep state. During the activation period, data transfer is performed in an activation section in which a synchronization error is within a predetermined range. In the sleep period, the minimum portion operates. The gateway performs resynchronization in accordance with the tree structure in order to maintain the synchronization operation.

SUMMARY OF THE INVENTION

According to a first aspect of the present invention, a wireless communication terminal in a wireless communication system is provided. The wireless communication terminal includes a wireless communicator, a memory, and a processor. The wireless communication system includes an integration device and two or more of the wireless communication terminals. One of the two or more of the wireless communication terminals is defined as a self-terminal. The processor of the self-terminal is configured to cause the wireless communicator to transmit a path-search packet including communication-path information to an adjacent terminal when the wireless communicator receives the path-search packet from a peripheral terminal. The communication-path information indicates a communication path of the path-search packet. The peripheral terminal is any one of the integration device and the adjacent terminal. The adjacent terminal is a wireless communication terminal that is included in the two or more of the wireless communication terminals and is adjacent to the self-terminal on the communication path. The processor of the self-terminal is configured to determine an upper-rank terminal on the basis of the path-search packet received by the wireless communicator from the peripheral terminal. The upper-rank terminal is the adjacent terminal and a first number is less than a second number. The first number is a number of wireless communication terminals that are included in the two or more of the wireless communication terminals and are present between the integration device and the upper-rank terminal on the communication path. The second number is a number of wireless communication terminals that are included in the two or more of the wireless communication terminals and are present between the integration device and the self-terminal on the communication path. The processor of the self-terminal is configured to store state information of the adjacent terminal on the memory on the basis of a notification received by the wireless communicator from the adjacent terminal. The state information indicates any one of a sleep state and a wake-up state. The processor of the self-terminal is configured to execute first sleep determination on the basis of the state information when the wireless communicator receives a sleep-declaration packet from a sleep-declaration terminal and the sleep-declaration terminal is the upper-rank terminal. The sleep-declaration terminal is the adjacent terminal that has transmitted the sleep-declaration packet. The processor of the self-terminal is configured to determine that sleep by the sleep-declaration terminal is accepted in the first sleep determination if the upper-rank terminal in the wake-up state other than the sleep-declaration terminal is present. The processor of the self-terminal is configured to determine that the sleep by the sleep-declaration terminal is not accepted in the first sleep determination if the upper-rank terminal in the wake-up state other than the sleep-declaration terminal is not present. The processor of the self-terminal is configured to cause the wireless communicator to transmit a sleep-prohibition packet to the sleep-declaration terminal when the processor of the self-terminal determines that the sleep by the sleep-declaration terminal is not accepted.

According to a second aspect of the present invention, in the first aspect, the processor of the self-terminal may be configured to cause the wireless communicator to transmit the sleep-declaration packet to the adjacent terminal when the self-terminal is in the wake-up state. The processor of the self-terminal may be configured to cause the wireless communicator to transmit a sleep-notification packet to the adjacent terminal if the wireless communicator does not receive the sleep-prohibition packet from the adjacent terminal in a predetermined period after the wireless communicator transmits the sleep-declaration packet. The processor of the self-terminal may be configured to execute sleep processing for changing a state of the self-terminal to the sleep state in which power consumption is less than power consumption in the wake-up state after the wireless communicator transmits the sleep-notification packet. The processor of the self-terminal may be configured to execute wake-up processing for changing the state of the self-terminal from the sleep state to the wake-up state after the sleep processing is executed. The processor of the self-terminal may be configured to cause the wireless communicator to transmit a wake-up notification packet to the adjacent terminal after the wake-up processing is executed. The processor of the self-terminal may be configured to store the state information on the memory on the basis of the sleep-notification packet received by the wireless communicator from the adjacent terminal and the wake-up notification packet received by the wireless communicator from the adjacent terminal.

According to a third aspect of the present invention, in the second aspect, the processor of the self-terminal may be configured to determine a same-rank terminal on the basis of the path-search packet received by the wireless communicator from the peripheral terminal. A third number may be the same as a fourth number. The third number is a number of the wireless communication terminals that are present between the integration device and the self-terminal on the communication path. The fourth number is a number of the wireless communication terminals that are present between the integration device and the same-rank terminal on the communication path. The processor of the self-terminal may be configured to cause the wireless communicator to transmit the sleep-declaration packet to the adjacent terminal at a timing at which the sleeping same-rank terminal wakes up, in a first case in which the wireless communicator receives the sleep-prohibition packet from the adjacent terminal in the predetermined period and the state information of the sleeping same-rank terminal is stored on the memory.

According to a fourth aspect of the present invention, in the third aspect, the sleep-notification packet may include period information related to a sleep period in which the wireless communication terminal transmitting the sleep-notification packet sleeps. In the first case, the processor of the self-terminal may be configured to execute timing determination on the basis of the period information before the self-terminal next starts sleeping. The processor of the self-terminal may be configured to determine whether or not a scheduled time point for wake-up by the sleeping same-rank terminal is earlier than a scheduled time point for sleep in the timing determination. The scheduled time point for wake-up is a time point at which the same-rank terminal stops sleeping. The scheduled time point for sleep is a time point at which the self-terminal starts sleeping. The processor of the self-terminal may be configured to cause the wireless communicator to transmit the sleep-declaration packet to the adjacent terminal at the scheduled time point for wake-up when the processor of the self-terminal determines that the scheduled time point for wake-up is earlier than the scheduled time point for sleep.

According to a fifth aspect of the present invention, in the second aspect, the sleep-declaration packet may include period information related to a sleep period in which the sleep-declaration terminal sleeps. The processor of the self-terminal may be configured to determine a same-rank terminal on the basis of the path-search packet received by the wireless communicator from the peripheral terminal. A third number may be the same as a fourth number. The third number is a number of the wireless communication terminals that are present between the integration device and the self-terminal on the communication path. The fourth number is a number of the wireless communication terminals that are present between the integration device and the same-rank terminal on the communication path. The processor of the self-terminal may be configured to execute second sleep determination in a case in which the wireless communicator receives the sleep-prohibition packet from the adjacent terminal in the predetermined period and the sleep-declaration terminal is the same-rank terminal. The processor of the self-terminal may be configured to determine whether or not there is a period in which the self-terminal and the sleep-declaration terminal are simultaneously sleeping on the basis of a scheduled time point for sleep by the self-terminal and the sleep period of the sleep-declaration terminal in the second sleep determination. The scheduled time point for sleep is a time point at which the self-terminal starts sleeping. The processor of the self-terminal may be configured to determine that the sleep by the sleep-declaration terminal is not accepted in the second sleep determination when the processor of the self-terminal determines that there is the period in which the self-terminal and the sleep-declaration terminal are simultaneously sleeping.

According to a sixth aspect of the present invention, in the fifth aspect, the processor of the self-terminal may be configured to determine a lower-rank terminal on the basis of the path-search packet received by the wireless communicator from the peripheral terminal. A fifth number may be greater than a sixth number. The fifth number is a number of the wireless communication terminals that are present between the integration device and the lower-rank terminal on the communication path. The sixth number is a number of the wireless communication terminals that are present between the integration device and the self-terminal on the communication path. The processor of the self-terminal may be configured to store detour information that indicates whether or not the same-rank terminal is included in the communication path of the lower-rank terminal on the memory. The processor of the self-terminal may be configured to determine whether or not the sleep-declaration terminal is the same-rank terminal included in the communication path of the lower-rank terminal on the basis of the detour information in the second sleep determination. The processor of the self-terminal may be configured to determine that the sleep by the sleep-declaration terminal is not accepted in the second sleep determination when the processor of the self-terminal determines that there is the period in which the self-terminal and the sleep-declaration terminal are simultaneously sleeping and the processor of the self-terminal determines that the sleep-declaration terminal is the same-rank terminal included in the communication path of the lower-rank terminal.

According to a seventh aspect of the present invention, in the second aspect, the processor of the self-terminal may be configured to determine a lower-rank terminal on the basis of the path-search packet received by the wireless communicator from the peripheral terminal. A fifth number may be greater than a sixth number. The fifth number is a number of the wireless communication terminals that are present between the integration device and the lower-rank terminal on the communication path. The sixth number is a number of the wireless communication terminals that are present between the integration device and the self-terminal on the communication path. The sleep-notification packet includes period information related to a sleep period in which the wireless communication terminal transmitting the sleep-notification packet sleeps. The processor of the self-terminal may be configured to determine a scheduled time point for wake-up by the sleeping lower-rank terminal on the basis of the period information. The scheduled time point for wake-up is a time point at which the lower-rank terminal stops sleeping. The processor of the self-terminal may be configured to determine a sleep period in which the self-terminal sleeps, in a second case in which the wireless communicator does not receive the sleep-prohibition packet from the adjacent terminal in the predetermined period and the state information of the sleeping lower-rank terminal is stored on the memory. The sleep period of the self-terminal is completed before the scheduled time point for wake-up by the sleeping lower-rank terminal.

According to an eighth aspect of the present invention, in the seventh aspect, the processor of the self-terminal may be configured to determine a scheduled sleep period in which the self-terminal is scheduled to sleep. The processor of the self-terminal may be configured to determine the sleep period of the self-terminal in the second case and in a third case in which the scheduled sleep period is completed after the scheduled time point for wake-up by the lower-rank terminal. The sleep-notification packet transmitted by the wireless communicator may include the period information related to the sleep period of the self-terminal.

According to a ninth aspect of the present invention, a wireless communication system including an integration device and two or more wireless communication terminals is provided. Each of the two or more of the wireless communication terminal includes a wireless communicator, a memory, and a processor. One of the two or more of the wireless communication terminals is defined as a self-terminal. The processor of the self-terminal is configured to cause the wireless communicator to transmit a path-search packet including communication-path information to an adjacent terminal when the wireless communicator receives the path-search packet from a peripheral terminal. The communication-path information indicates a communication path of the path-search packet. The peripheral terminal is any one of the integration device and the adjacent terminal. The adjacent terminal is a wireless communication terminal that is included in the two or more of the wireless communication terminals and is adjacent to the self-terminal on the communication path. The processor of the self-terminal is configured to determine an upper-rank terminal on the basis of the path-search packet received by the wireless communicator from the peripheral terminal. The upper-rank terminal is the adjacent terminal and a first number is less than a second number. The first number is a number of wireless communication terminals that are included in the two or more of the wireless communication terminals and are present between the integration device and the upper-rank terminal on the communication path. The second number is a number of wireless communication terminals that are included in the two or more of the wireless communication terminals and are present between the integration device and the self-terminal on the communication path. The processor of the self-terminal is configured to store state information of the adjacent terminal on the memory on the basis of a notification received by the wireless communicator from the adjacent terminal. The state information indicates any one of a sleep state and a wake-up state. The processor of the self-terminal is configured to execute first sleep determination on the basis of the state information when the wireless communicator receives a sleep-declaration packet from a sleep-declaration terminal and the sleep-declaration terminal is the upper-rank terminal. The sleep-declaration terminal is the adjacent terminal that has transmitted the sleep-declaration packet. The processor of the self-terminal is configured to determine that sleep by the sleep-declaration terminal is accepted in the first sleep determination if the upper-rank terminal in the wake-up state other than the sleep-declaration terminal is present. The processor of the self-terminal is configured to determine that the sleep by the sleep-declaration terminal is not accepted in the first sleep determination if the upper-rank terminal in the wake-up state other than the sleep-declaration terminal is not present. The processor of the self-terminal is configured to cause the wireless communicator to transmit a sleep-prohibition packet to the sleep-declaration terminal when the processor of the self-terminal determines that the sleep by the sleep-declaration terminal is not accepted.

According to a tenth aspect of the present invention, a wireless communication method executed by a processor of a wireless communication terminal in a wireless communication system is provided. The wireless communication system includes an integration device and two or more of the wireless communication terminals. The wireless communication terminal includes a wireless communicator, a memory, and the processor. In a case in which one of the two or more of the wireless communication terminals is defined as a self-terminal, the wireless communication method includes a first step, a second step, a third step, a fourth step, and a fifth step. The processor of the self-terminal causes the wireless communicator to transmit a path-search packet including communication-path information to an adjacent terminal in the first step when the wireless communicator receives the path-search packet from a peripheral terminal. The communication-path information indicates a communication path of the path-search packet. The peripheral terminal is any one of the integration device and the adjacent terminal. The adjacent terminal is a wireless communication terminal that is included in the two or more of the wireless communication terminals and is adjacent to the self-terminal on the communication path. The processor of the self-terminal determines an upper-rank terminal on the basis of the path-search packet received by the wireless communicator from the peripheral terminal in the second step. The upper-rank terminal is the adjacent terminal and a first number is less than a second number. The first number is a number of wireless communication terminals that are included in the two or more of the wireless communication terminals and are present between the integration device and the upper-rank terminal on the communication path. The second number is a number of wireless communication terminals that are included in the two or more of the wireless communication terminals and are present between the integration device and the self-terminal on the communication path. The processor of the self-terminal stores state information of the adjacent terminal on the memory on the basis of a notification received by the wireless communicator from the adjacent terminal in the third step. The state information indicates any one of a sleep state and a wake-up state. The processor of the self-terminal executes first sleep determination on the basis of the state information in the fourth step when the wireless communicator receives a sleep-declaration packet from a sleep-declaration terminal and the sleep-declaration terminal is the upper-rank terminal. The sleep-declaration terminal is the adjacent terminal that has transmitted the sleep-declaration packet. The processor of the self-terminal determines that sleep by the sleep-declaration terminal is accepted in the first sleep determination if the upper-rank terminal in the wake-up state other than the sleep-declaration terminal is present. The processor of the self-terminal determines that the sleep by the sleep-declaration terminal is not accepted in the first sleep determination if the upper-rank terminal in the wake-up state other than the sleep-declaration terminal is not present. The processor of the self-terminal causes the wireless communicator to transmit a sleep-prohibition packet to the sleep-declaration terminal in the fifth step when the processor of the self-terminal determines that the sleep by the sleep-declaration terminal is not accepted.

According to an eleventh aspect of the present invention, a non-transitory computer-readable recording medium saving a program for causing a processor of a wireless communication terminal in a wireless communication system to execute processing is provided. The wireless communication system includes an integration device and two or more of the wireless communication terminals. In a case in which one of the two or more of the wireless communication terminals is defined as a self-terminal, the processing includes a first step, a second step, a third step, a fourth step, and a fifth step. The processor of the self-terminal causes the wireless communicator to transmit a path-search packet including communication-path information to an adjacent terminal in the first step when the wireless communicator receives the path-search packet from a peripheral terminal. The communication-path information indicates a communication path of the path-search packet. The peripheral terminal is any one of the integration device and the adjacent terminal. The adjacent terminal is a wireless communication terminal that is included in the two or more of the wireless communication terminals and is adjacent to the self-terminal on the communication path. The processor of the self-terminal determines an upper-rank terminal on the basis of the path-search packet received by the wireless communicator from the peripheral terminal in the second step. The upper-rank terminal is the adjacent terminal and a first number is less than a second number. The first number is a number of wireless communication terminals that are included in the two or more of the wireless communication terminals and are present between the integration device and the upper-rank terminal on the communication path. The second number is a number of wireless communication terminals that are included in the two or more of the wireless communication terminals and are present between the integration device and the self-terminal on the communication path. The processor of the self-terminal stores state information of the adjacent terminal on the memory on the basis of a notification received by the wireless communicator from the adjacent terminal in the third step. The state information indicates any one of a sleep state and a wake-up state. The processor of the self-terminal executes first sleep determination on the basis of the state information in the fourth step when the wireless communicator receives a sleep-declaration packet from a sleep-declaration terminal and the sleep-declaration terminal is the upper-rank terminal. The sleep-declaration terminal is the adjacent terminal that has transmitted the sleep-declaration packet. The processor of the self-terminal determines that sleep by the sleep-declaration terminal is accepted in the first sleep determination if the upper-rank terminal in the wake-up state other than the sleep-declaration terminal is present. The processor of the self-terminal determines that the sleep by the sleep-declaration terminal is not accepted in the first sleep determination if the upper-rank terminal in the wake-up state other than the sleep-declaration terminal is not present. The processor of the self-terminal causes the wireless communicator to transmit a sleep-prohibition packet to the sleep-declaration terminal in the fifth step when the processor of the self-terminal determines that the sleep by the sleep-declaration terminal is not accepted.

BRIEF DESCRIPTION OF THE DRAWINGS

FIG. 5A is a diagram showing the positional relationship between terminals according to the embodiment of the present invention.

FIG. 5B is a diagram showing the positional relationship between terminals according to the embodiment of the present invention.

FIG. 5C is a diagram showing the positional relationship between terminals according to the embodiment of the present invention.

FIG. 5D is a diagram showing the positional relationship between terminals according to the embodiment of the present invention.

FIG. 6A is a diagram showing the positional relationship between terminals according to the embodiment of the present invention.

FIG. 6B is a diagram showing the positional relationship between terminals according to the embodiment of the present invention.

FIG. 6C is a diagram showing the positional relationship between terminals according to the embodiment of the present invention.

FIG. 6D is a diagram showing the positional relationship between terminals according to the embodiment of the present invention.

FIG. 26A is a diagram showing adjacent terminal information in the embodiment of the present invention.

FIG. 26B is a diagram showing adjacent terminal information in the embodiment of the present invention.

FIG. 26C is a diagram showing adjacent terminal information in the embodiment of the present invention.

DETAILED DESCRIPTION OF THE INVENTION

Hereinafter, embodiments of the present invention will be described with reference to the drawings.
(Network Configuration)

Figure 1:
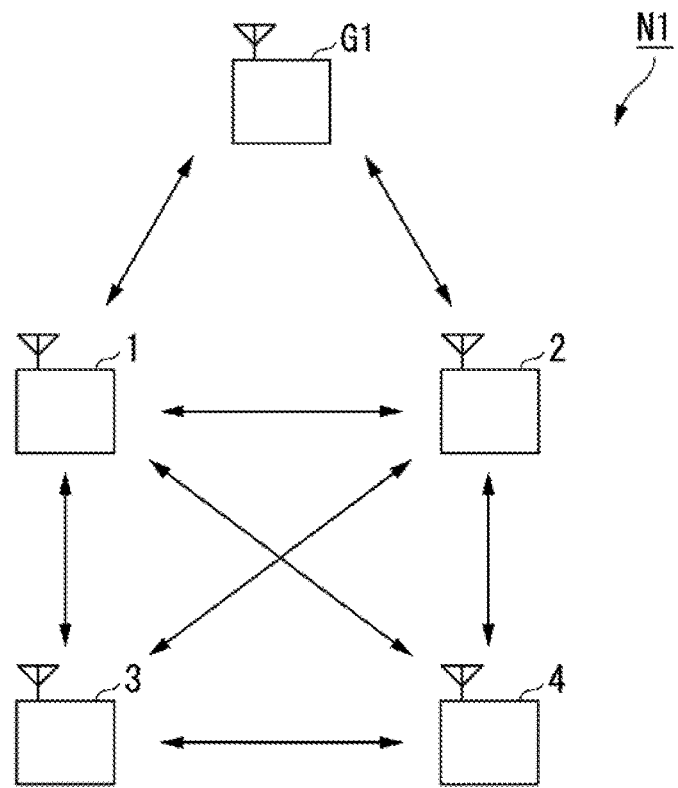
FIG. 1 is a diagram showing a configuration of a network according to an embodiment of the present invention.

FIG. 1 shows a configuration of a network N1 according to an embodiment of the present invention. The network N1 shown in FIG. 1 includes a gateway G1, a terminal 1, a terminal 2, a terminal 3, and a terminal 4. The gateway G1 and the terminals 1 to 4 have a wireless communication function and perform wireless communication with adjacent terminals. After the system of each terminal is activated, the terminals 1 to 4 operate in any one of a wake-up state and a sleep state in accordance with conditions. Each of the terminals 1 to 4 includes a sensor that measures environmental characteristics. Each terminal wakes up when the sensor performs measurement. Each terminal basically sleeps in a period other than the period in which it is awake. Each terminal always operates in the wake-up state under the condition that it has not acquired its own communication-path information after the system is activated. The terminals 1 to 4 go into the sleep state in accordance with the situation after executing the processing for acquiring the communication-path information.

The gateway G1 is connected to an external network such as the Internet. Communication packets transmitted by the terminals 1 to 4 to the external network pass through the gateway G1. The gateway G1 is an integration device (relay device) that relays communication packets transmitted by the terminals 1 to 4 between different networks.

The gateway G1 is always in the wake-up state. The gateway G1 receives an instruction from the outside and transmits a path-search packet necessary for the terminals 1 to 4 to acquire the communication-path information. The instruction from the outside is generated through a user's operation or the communication with the external network. Furthermore, the gateway G1 collects communication packets transmitted by the terminals 1 to 4. In addition, the gateway G1 plays a role of connecting to the external network, a role of collecting communication packets transmitted from the terminals 1 to 4, and a role of routing the communication packets to the external network. The gateway G1 may include a communicator that operates by using a communication method different from the communication method of the wireless communicators included in the terminals 1 to 4. In the gateway G1, the communicator connecting to the external network may correspond to wired or wireless communication. The external network is an IP network such as the Internet.

In the example shown in FIG. 1, the terminal 1 and the terminal 2 are located in the communication range of the gateway G1. The communication range of the gateway G1 is a range reached by radio waves from the gateway G1. The terminal 3 and the terminal 4 are located at positions at which the terminal 3 and the terminal 4 are unable to directly communicate with the gateway G1. The terminal 1 is located at a position at which the terminal 1 is able to communicate with the terminals 2 to 4. The terminal 2 is located at a position at which the terminal 2 is able to communicate with the terminal 1, the terminal 3, and the terminal 4. The terminal 3 is located at a position at which the terminal 3 is able to communicate with the terminal 1, the terminal 2, and the terminal 4. The terminal 4 is located at a position at which the terminal 4 is able to communicate with the terminals 1 to 3.

Each terminal simultaneously transmits packets to a plurality of terminals by broadcast communication. The terminal adjacent to each terminal transmits the received packet. In this way, packets are transferred to the gateway G1. In a case in which there are a plurality of communication paths from each terminal to the gateway G1, packets reach the gateway G1 by passing through the plurality of communication paths. In such a case, the certainty that a packet transmitted by each terminal reaches the gateway G1 is enhanced.

A unique ID is assigned to each terminal. For example, the ID of the gateway G1 is 0000, the ID of the terminal 1 is 0001, the ID of the terminal 2 is 0002, the ID of the terminal 3 is 0003, and the ID of the terminal 4 is 0004. Each terminal adds its own ID to a packet when the terminal transmits the packet. Since a packet is transmitted by the broadcast communication, there is a case in which the packet transmitted by each terminal returns thereto. Each terminal confirms the ID added to the received packet. Each terminal does not transmit the packet when the terminal's own ID is already added to the packet.

Figure 2:
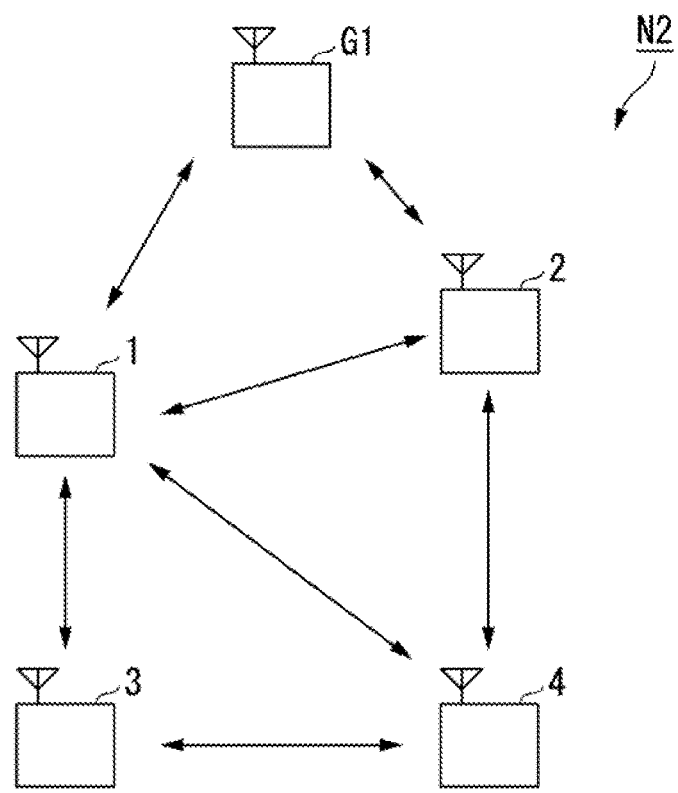
FIG. 2 is a diagram showing a configuration of the network according to the embodiment of the present invention.

FIG. 2 shows a configuration of a network N2 according to the embodiment of the present invention. The configuration of the network N2 is almost the same as the configuration of the network N1. In the network N2, the terminal 2 and the terminal 3 are located at positions at which radio waves from one of the terminal 2 and the terminal 3 do not reach the other terminal. The terminal 2 and the terminal 3 are unable to directly communicate with each other. As long as the features of the present invention can be realized, the arrangement of each terminal on the network is not limited to the examples shown in FIG. 1 and FIG. 2.

(System Configuration)

Figure 3A:
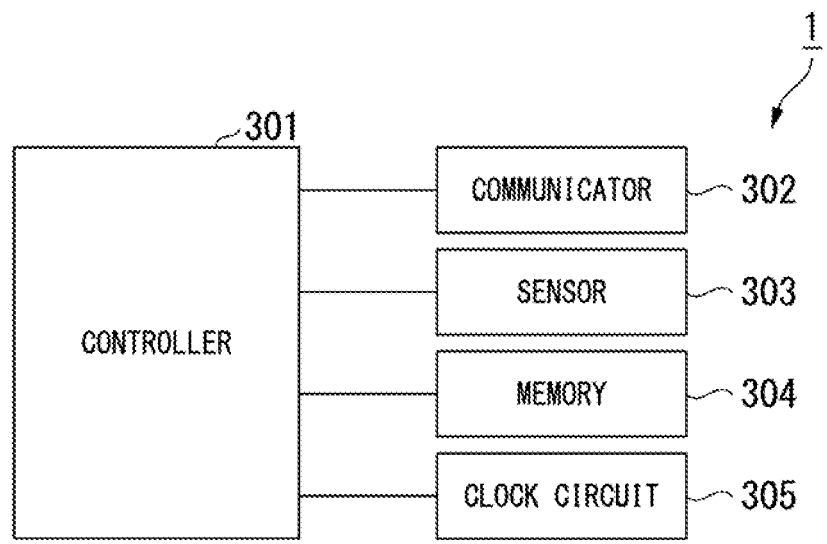
FIG. 3A is a bloc diagram showing a system configuration of a terminal according to the embodiment of the present invention.

FIG. 3A shows a system configuration of the terminal 1. Since the configuration of the terminals 2 to 4 is the same as the configuration of the terminal 1, the configuration of the terminal 1 will be described as a representative example. The terminal 1 shown in FIG. 3A includes a controller 301, a communicator 302, a sensor 303, a memory 304, and a clock circuit 305.

A schematic configuration of the terminal 1 will be described. The terminal 1 is a wireless communication terminal in a wireless communication system. The wireless communication system includes an integration device and two or more wireless communication terminals. In the following example, the integration device is the gateway G1. The integration device may be a router, a firewall, a proxy server, or the like. The two or more wireless communication terminals include the terminal 1 (self-terminal) and an adjacent terminal. The adjacent terminal will be described later. The self-terminal is a terminal including the controller 301 that executes processing.

The communicator 302 is a wireless communicator. When the communicator 302 receives a path-search packet including communication-path information from a peripheral terminal, the controller 301 causes the communicator 302 to transmit the path-search packet to the adjacent terminal. The communication-path information indicates a communication path of the path-search packet. The peripheral terminal is any one of the integration device and the adjacent terminal. The adjacent terminal is a wireless communication terminal adjacent to the self-terminal on the communication path. The self-terminal is able to directly communicate with the adjacent terminal. There is a case in which the adjacent terminal that is a destination of the path-search packet is different from the peripheral terminal that transmits the path-search packet. The controller 301 determines an upper-rank terminal on the basis of the path-search packet received by the communicator 302 from the peripheral terminal. The upper-rank terminal is the adjacent terminal. A first number is less than a second number. The first number is the number of wireless communication terminals that are present between the integration device and the upper-rank terminal on the communication path. The second number is the number of wireless communication terminals that are present between the integration device and the self-terminal on the communication path.

The controller 301 stores state information of the adjacent terminal on the memory 304 on the basis of a notification received by the communicator 302 from the adjacent terminal. The state information indicates any one of the sleep state and the wake-up state. The wireless communication terminal in the sleep state is sleeping. The wireless communication terminal in the wake-up state is awake. When the communicator 302 receives a sleep-declaration packet from a sleep-declaration terminal and the sleep-declaration terminal is the upper-rank terminal, the controller 301 executes first sleep determination on the basis of the state information. The sleep-declaration terminal is the adjacent terminal that has transmitted the sleep-declaration packet. If the upper-rank terminal in the wake-up state other than the sleep-declaration terminal is present, the controller 301 determines that sleep by the sleep-declaration terminal is accepted in the first sleep determination. If the upper-rank terminal in the wake-up state other than the sleep-declaration terminal is not present, the controller 301 determines that the sleep by the sleep-declaration terminal is not accepted in the first sleep determination. When the controller 301 determines that the sleep by the sleep-declaration terminal is not accepted, the controller 301 causes the communicator 302 to transmit a sleep-prohibition packet to the sleep-declaration terminal.

A detailed configuration of the terminal 1 will be described. The controller 301 is constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). The controller 301 may include one or a plurality of processors. The controller 301 may include one or a plurality of logic circuits.

The controller 301 controls the entire system. The controller 301 generates a packet including the data acquired by the sensor 303. The controller 301 also generates a packet such as a sleep declaration, a sleep notification, a sleep prohibition, a sleep cancelation, a wake-up notification, and a wake-up response. The controller 301 adds the self-terminal's ID to the packet received from the peripheral terminal. The controller 301 analyzes the type of the packet received by the communicator 302 and extracts information such as the ID added to the packet. The controller 301 determines the positional relationship between the adjacent terminal and the self-terminal with respect to the gateway G1 on the basis of the extracted ID and manages the positional relationship.

The terminal 1 goes into any one of the wake-up state and the sleep state. The state of the terminal 1 switches between the wake-up state and the sleep state. When the terminal 1 is awake, the terminal 1 supplies the communicator 302 and the sensor 303 with electrical power. At this time, the system operates with all its strength. When the terminal 1 is sleeping, the power supply of the communicator 302 and the sensor 303 is cut off. At this time, the system goes into a low power-consumption state in which only the minimum function necessary for maintaining the operation of the system operates. The minimum function is generating a clock, monitoring the internal state, or the like. The controller 301 controls wake-up by the system and sleep by the system.

The controller 301 may read a program and execute the read program. The program includes commands defining the operations of the controller 301. In other words, the functions of the controller 301 may be realized by software. The program, for example, may be provided by using a "computer-readable storage medium" such as a flash memory. The program may be transmitted from a computer storing the program to the terminal 1 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

The communicator 302 includes an antenna. Alternatively, the communicator 302 and an antenna are separately constituted and the communicator 302 is connected to the antenna. The communicator 302 performs wireless communication. The communicator 302 transmits the packet generated by the controller 301 to the peripheral terminal by broadcasting. The communicator 302 receives a packet from the peripheral terminal.

The controller 301 transmits a packet to the peripheral terminal by using the communicator 302. Specifically, the controller 301 controls the communicator 302 such that a packet is transmitted to the peripheral terminal. In other words, the controller 301 causes the communicator 302 to transmit a packet for the peripheral terminal. In this way, the communicator 302 transmits a packet to the peripheral terminal. The controller 301 receives a packet from the peripheral terminal by using the communicator 302. Specifically, the controller 301 controls the communicator 302 such that a packet is received from the peripheral terminal. In other words, the controller 301 causes the communicator 302 to receive a packet transmitted from the peripheral terminal. In this way, the communicator 302 receives a packet from the peripheral terminal.

The sensor 303 measures a physical quantity such as temperature or humidity. The sensor 303 generates sensor data by converting the measured physical quantity into an electrical signal.

The memory 304 is a volatile or nonvolatile memory. For example, the memory 304 is at least one of a random access memory (RAM), a dynamic random access memory (DRAM), a static random access memory (SRAM), a read-only memory (ROM), an erasable programmable read-only memory (EPROM), an electrically erasable programmable read-only memory (EEPROM), and a flash memory. The memory 304 stores various kinds of information. For example, the information stored on the memory 304 includes adjacent terminal information. The adjacent terminal information includes information that indicates the positional relationship between the self-terminal and the adjacent terminal. The positional relationship between the self-terminal and the adjacent terminal is obtained from the communication-path information. The adjacent terminal information includes the state information of the adjacent terminal. The state information of the adjacent terminal indicates whether the adjacent terminal is in the wake-up state or the sleep state. The information stored on the memory 304 includes a reception history of the sleep-prohibition packet. The reception history of the sleep-prohibition packet indicates that sleep by the self-terminal has been rejected.

The clock circuit 305 counts the internal time point of the system. Time information indicates the internal time point of the system.

Figure 3B:
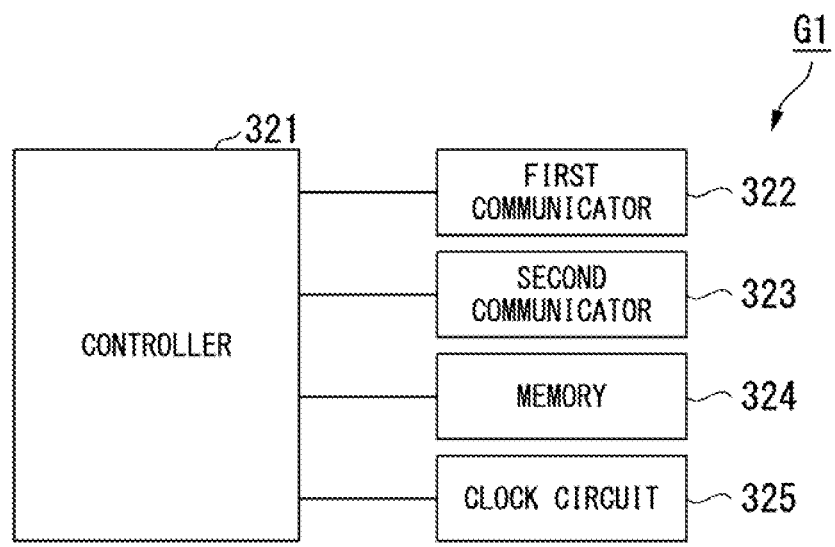
FIG. 3B is a bloc diagram showing a system configuration of a gateway according to the embodiment of the present invention.

FIG. 3B shows a system configuration of the gateway G1. The gateway G1 shown in FIG. 3B includes a controller 321, a first communicator 322, a second communicator 323, a memory 324, and a clock circuit 325.

The controller 321 controls the entire system. The first communicator 322 is connected to an external network. The first communicator 322 performs communication with a communication device on the external network. The communication performed by the first communicator 322 may be wired or wireless communication. The second communicator 323 performs wireless communication with the terminal 1 and the terminal 2. The first communicator 322 transmits a packet received by the second communicator 323 from the terminal 1 or the terminal 2 to the external network. The second communicator 323 transmits a packet received by the first communicator 322 from the external network to the terminal 1 or the terminal 2. The memory 324 stores various kinds of information. The clock circuit 325 counts the internal time point of the system.

(Sequence of Communication-Path Search)

Figure 4:
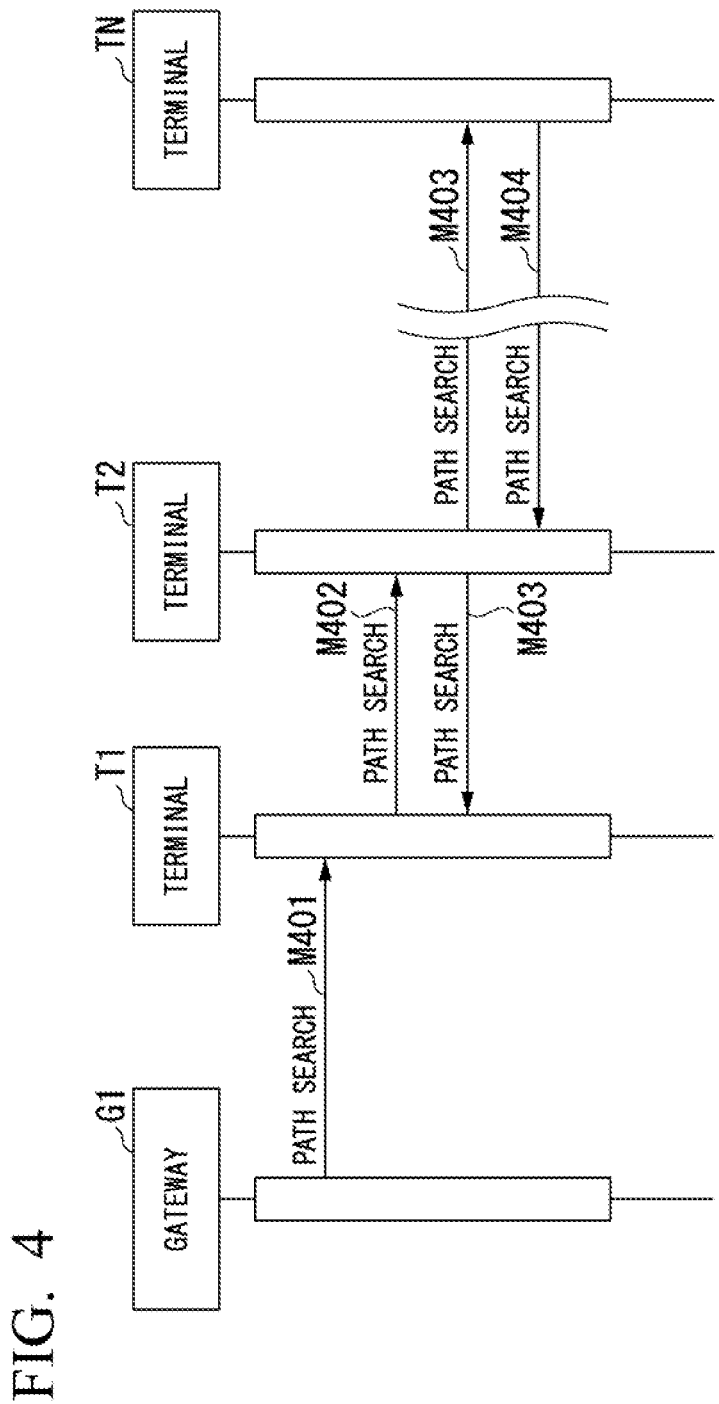
FIG. 4 is a diagram showing a communication sequence in the network according to the embodiment of the present invention.

FIG. 4 shows a communication sequence when communication-path search is executed. In FIG. 4, the example in which N terminals are arranged. The number N is an integer of two or more. The terminal T1 is a terminal of a first hop. The terminal T2 is a terminal of a second hop. The terminal TN is a terminal of an N-th hop. The number N indicates the number of times that the packet arriving from the gateway G1 is transferred. In other words, the number N indicates the number of hops of packets.

The gateway G1 transmits a path-search packet M401 by broadcasting. The ID unique to the gateway G1 is added to the path-search packet M401. The terminal T1 corresponds to the terminal 1 and the terminal 2 in FIG. 1. After the terminal T1 receives the path-search packet M401 from the gateway G1, the terminal T1 adds its own ID to the packet. The terminal T1 transmits a path-search packet M402 by broadcasting. In this way, the terminal T1 transfers the path-search packet M402. The path-search packet M402 transmitted by the terminal T1 reaches the terminal T2. In FIG. 1, the path-search packet transmitted by the terminal 1 reaches the terminals 2 to 4. In FIG. 1, the path-search packet transmitted by the terminal 2 reaches the terminals 1, 3, and 4.

The terminal T2 receives the path-search packet M402 and adds its own ID to the packet. The terminal T2 transmits a path-search packet M403. The terminal T1 receives the path-search packet M403. The terminal that has received the path-search packet M403 transmits a path-search packet M404 to which its own ID is added. The terminal T2 receives the path-search packet M404. The path-search packet is sequentially transferred to the terminal TN through hops.

The ID of the terminal transmitting the path-search packet is added to the packet. When the terminal receives the path-search packet to which the same ID as its own ID is added, the terminal does not transmit the packet. Under this condition, hopping of packets eventually converges. Each terminal receives the path-search packet from the terminal adjacent thereto. Therefore, each terminal can understand the ID of the terminal adjacent to the self-terminal by analyzing the received path-search packet. Each terminal can understand the positional relationship between the self-terminal and the adjacent terminal on the basis of the order of IDs added to the path-search packet. In this positional relationship, the terminal close to the gateway G1 is at an upper rank.

(Adjacent Terminal Information of Each Terminal)

FIG. 5A, FIG. 5B, FIG. 5C, and FIG. 5D show the positional relationship between terminals in the network N1 in FIG. 1. The path-search packet is transmitted from the gateway G1. Each terminal adds its own ID to the path-search packet and transmits the path-search packet. The controller 301 of each terminal determines the positional relationship between the self-terminal and the adjacent terminal on the basis of the ID added to the path-search packet. The controller 301 stores the determined positional relationship as the adjacent terminal information on the memory 304.

FIG. 5A shows information held by the terminal 1. The terminal 1 is located at a position that radio waves emitted by the gateway G1 reach. The terminal 1 directly receives the path-search packet transmitted by the gateway G1. The path-search packet spreads out on the entire network through hops. For example, the path-search packet reaches the terminal 1 via the communication path passing through the terminal 2 and the terminal 1. Alternatively, the path-search packet reaches the terminal 1 via the communication path passing through the terminal 2, the terminal 3, and the terminal 1. Alternatively, the path-search packet reaches the terminal 1 via the communication path passing through the terminal 2, the terminal 4, and the terminal 1. Another communication path of the path-search packet other than the above-described communication paths is available.

FIG. 5B shows information held by the terminal 2. FIG. 5C shows information held by the terminal 3. FIG. 5D shows information held by the terminal 4. The information held by each terminal includes the communication path of the path-search packet. The information held by each terminal includes information of each of the adjacent terminal, the upper-rank terminal, the same-rank terminal, and the lower-rank terminal. Hereinafter, information held by the terminal 1 will be described as a representative example.

The ID of each terminal is added to the path-search packet in the order that the path-search packet is transmitted from each terminal. Therefore, the controller 301 can understand the ID of the terminal that transmits the path-search packet directly to the terminal 1. In other words, the controller 301 can understand the terminal adjacent to the terminal 1 on the communication path of the path-search packet, that is, the adjacent terminal of the terminal 1. The terminal 1 receives the path-search packet directly from the terminal 2, the terminal 3, and the terminal 4. The adjacent terminal of the terminal 1 is the terminal 2, the terminal 3, and the terminal 4.

The controller 301 can understand the minimum hop number when the path-search packet reaches the terminal 1 from the gateway G1 by analyzing the order of IDs added to the path-search packet. Similarly, the controller 301 can understand the minimum hop number when the path-search packet reaches the adjacent terminal of the terminal 1 from the gateway G1.

The first ID in the line of IDs indicating the communication path is the ID of the terminal that receives the path-search packet from the gateway G1. The terminal 1 receives the path-search packet directly from the gateway G1. The terminal 2 also receives the path-search packet directly from the gateway G1. Accordingly, the controller 301 can determine that the distance from the terminal 1 to the gateway G1 is the same as the distance from the terminal 2 to the gateway G1. In other words, the controller 301 can determine that the terminal 2 is the same-rank terminal of the terminal 1.

Similarly, the controller 301 analyzes the information of the communication path including the ID of the terminal 3 and the information of the communication path including the ID of the terminal 4. The terminal 3 and the terminal 4 receive the path-search packet from the terminal 1 or the terminal 2. The controller 301 can determine that the distance from the terminal 1 to the gateway G1 is less than the distance from the terminal 3 to the gateway G1. Similarly, the controller 301 can determine that the distance from the terminal 1 to the gateway G1 is less than the distance from the terminal 4 to the gateway G1. In other words, the controller 301 can determine that the terminal 3 and the terminal 4 are the lower-rank terminals of the terminal 1.

In a case in which the distance from the terminal 1 to the gateway G1 is greater than the distance from a certain terminal to the gateway G1, the controller 301 can determine that the certain terminal is the upper-rank terminal. The upper-rank terminal of the terminal 1 is not present. The same-rank terminal, the lower-rank terminal, and the upper-rank terminal are the adjacent terminals.

The controller 301 stores information of the adjacent terminal shown in FIG. 5A on the memory 304. The terminals 2 to 4 can also obtain information of the adjacent terminal by using a method similar to the above-described method. In FIGS. 5A to 5D, the ID of each terminal is shown as a terminal number for the sake of brevity. In fact, the ID unique to each terminal is stored as information of the adjacent terminal.

FIG. 6A, FIG. 6B, FIG. 6C, and FIG. 6D show the positional relationship between terminals in the network N2 in FIG. 2. In the network N2, the terminal 2 and the terminal 3 are not located in a range in which radio waves from one terminal reach the other terminal. Therefore, the terminal 2 and the terminal 3 are unable to communicate with each other. Although the terminal 2 and the terminal 3 are adjacent to each other in the network N1 shown in FIG. 1, the terminal 2 and the terminal 3 are not adjacent to each other in the network N2. While the terminal 3 is the lower-rank terminal of the terminal 2 in the network N1, the lower-rank terminal of the terminal 2 is only the terminal 4 in the network N2.

While the terminal 2 is the upper-rank terminal of the terminal 3 in the network N1, the upper-rank terminal of the terminal 3 is only the terminal 1 in the network N2. In FIGS. 6A to 6D, the ID of each terminal is shown as a terminal number for the sake of brevity. In fact, the ID unique to each terminal is stored as information of the adjacent terminal.

(Sequence of Wake-Up and Sleep by Terminals)

Figure 7:
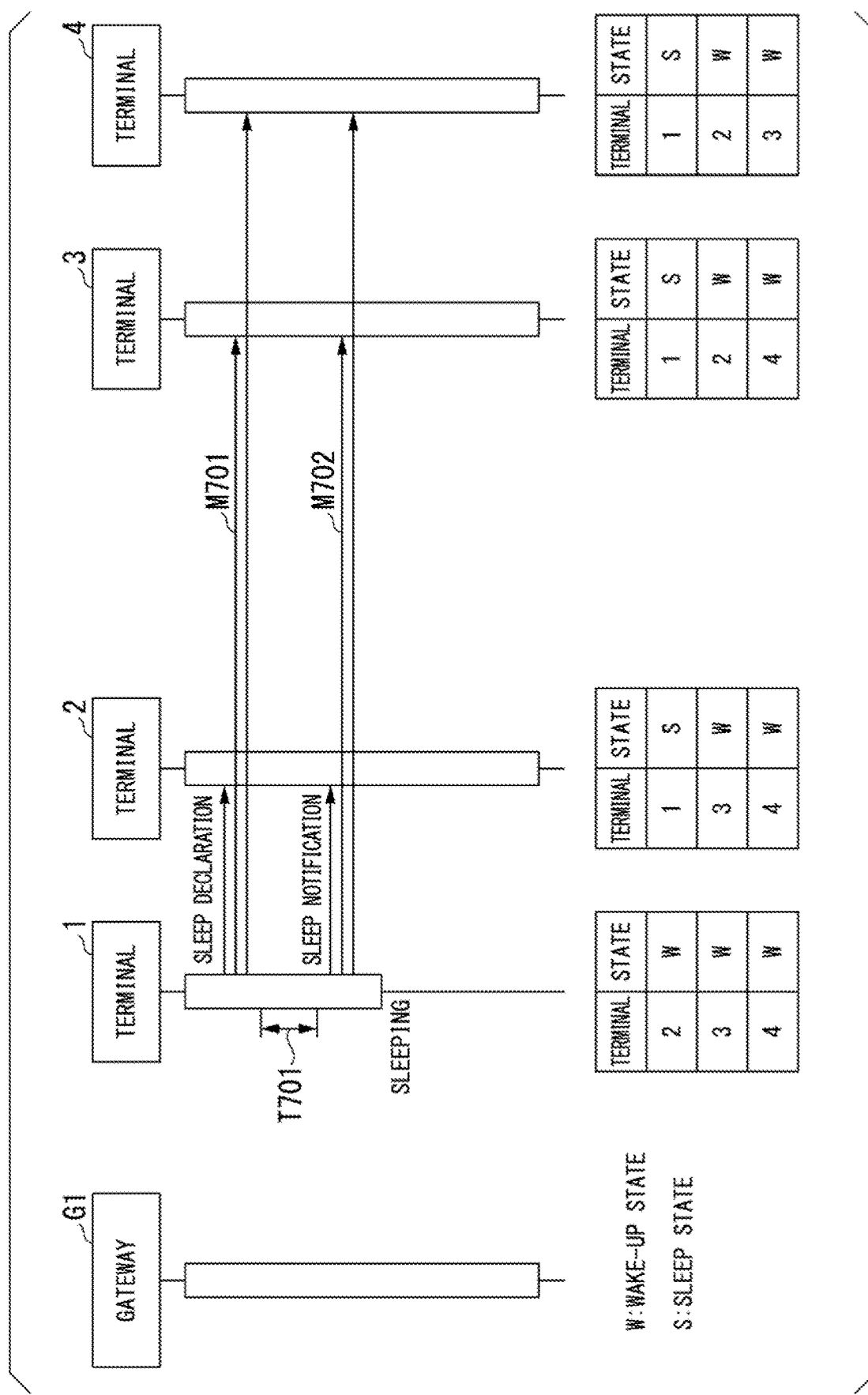
FIG. 7 is a diagram showing a communication sequence in the network according to the embodiment of the present invention.

Packet communication executed by a terminal when the terminal wakes up or goes into the sleep state in the network N1 will be described. FIG. 7 shows a communication sequence when all the terminals are awake and the terminal 1 goes into the sleep state. The state information of the adjacent terminal managed by each terminal is shown under the sequence of each terminal. The state information of the adjacent terminal is stored on the memory 304 of each terminal. The state W is the wake-up state. The state S is the sleep state.

It is premised that each terminal can understand the presence of the adjacent terminal of the self-terminal in the process of the path search. Furthermore, each terminal can understand that the adjacent terminal is in the wake-up state by receiving the path-search packet from the adjacent terminal. Therefore, the fact that the state of each terminal adjacent to the self-terminal is the wake-up state is stored. The terminal 1 transmits a sleep-declaration packet M701 by broadcasting at a timing at which the terminal 1 can go into the sleep state. The sleep-declaration packet M701 indicates that the terminal 1 is scheduled to go into the sleep state. The timing at which each terminal can go into the sleep state means a timing at which the sensor 303 completes periodical acquisition of sensor data or the like and each terminal can sleep until the terminal next acquires sensor data or the like. The terminal 2, the terminal 3, and the terminal 4 are the adjacent terminals of the terminal 1. Therefore, the terminal 2, the terminal 3, and the terminal 4 receive the sleep-declaration packet M701.

The terminal 1 waits for a response for a response-waiting time T701 after transmitting the sleep-declaration packet M701. The response-waiting time T701 is, for example, two seconds. Each of the terminals 2 to 4 confirms whether or not the communication path to the gateway G1 is secured when each of the terminals transmits a data packet to the gateway G1. When the communication path has been secured, the terminals 2 to 4 do not respond to the sleep-declaration packet M701.

The terminal 2 can send a packet directly to the gateway G1. The terminal 3 and the terminal 4 can send a packet to the gateway G1 via the terminal 2. A packet does not reach the terminal 1 from the adjacent terminal in the response-waiting time T701. After the response-waiting time T701 elapses, the terminal 1 transmits a sleep-notification packet M702 by broadcasting. The sleep-notification packet M702 indicates that the terminal 1 has gone into the sleep state. The terminals 2 to 4 store the state information that indicates that the terminal 1 is sleeping on the memory 304 after receiving the sleep-notification packet M702. The state information after the terminal 1 goes into the sleep state is shown in FIG. 7.

Figure 8:
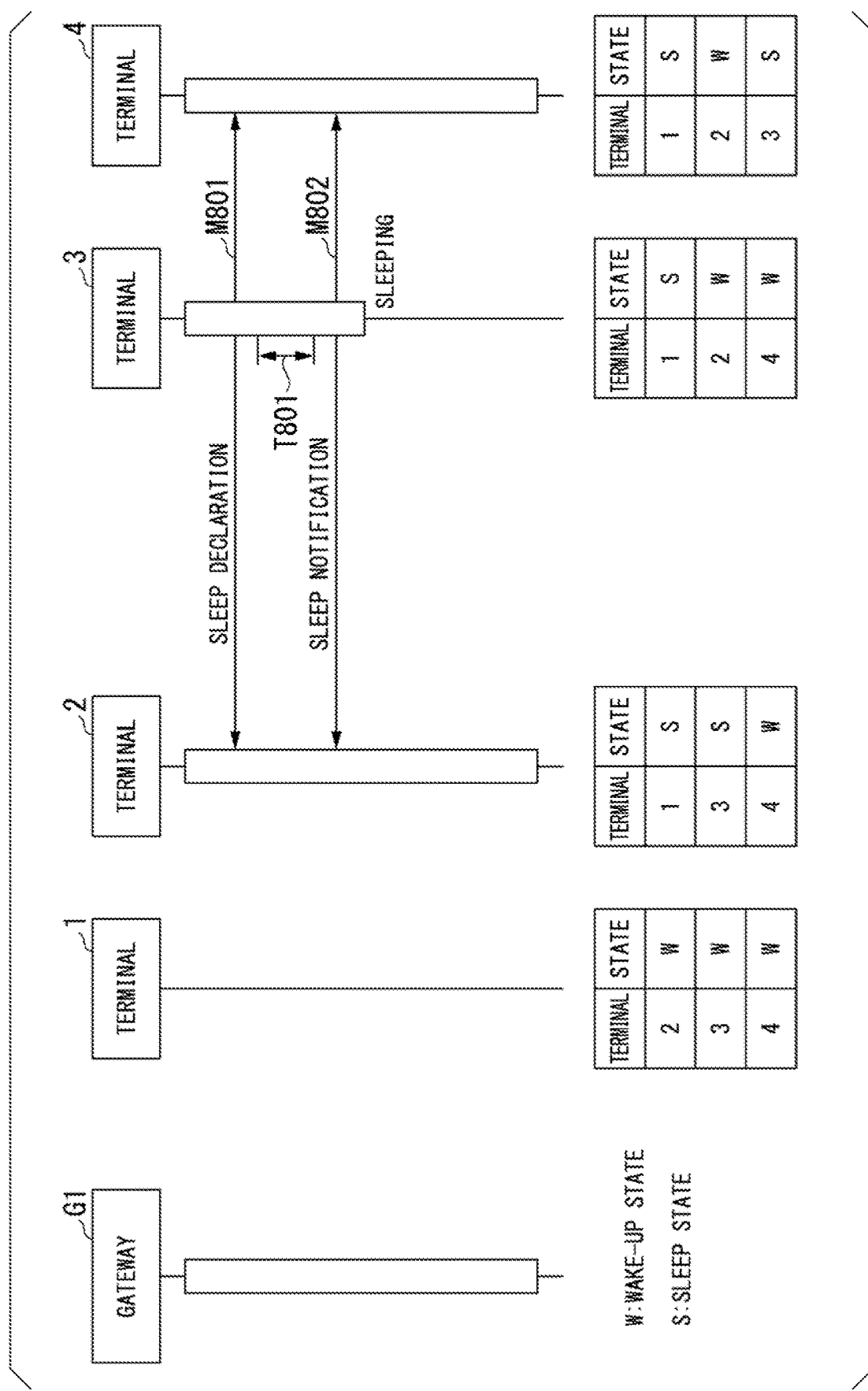
FIG. 8 is a diagram showing a communication sequence in the network according to the embodiment of the present invention.

FIG. 8 shows a communication sequence when the terminal 3 goes into the sleep state while the terminal 1 is sleeping. The terminal 3 transmits a sleep-declaration packet M801 by broadcasting. The terminal 2 and the terminal 4 receive the sleep-declaration packet M801. The communication path from the terminal 2 to the gateway G1 and the communication path from the terminal 4 to the gateway G1 have been secured. Therefore, the terminal 2 and the terminal 4 do not respond to the sleep-declaration packet M801. The terminal 3 waits for a response for a response-waiting time T801. A response is not received from the adjacent terminals of the terminal 3 in the response-waiting time T801. Therefore, the terminal 3 transmits a sleep-notification packet M802 by broadcasting and goes into the sleep state. The terminal 2 and the terminal 4 store the state information that indicates that the terminal 3 is sleeping on the memory 304 after receiving the sleep-notification packet M802. The state information after the terminal 3 goes into the sleep state is shown in FIG. 8.

Figure 9:
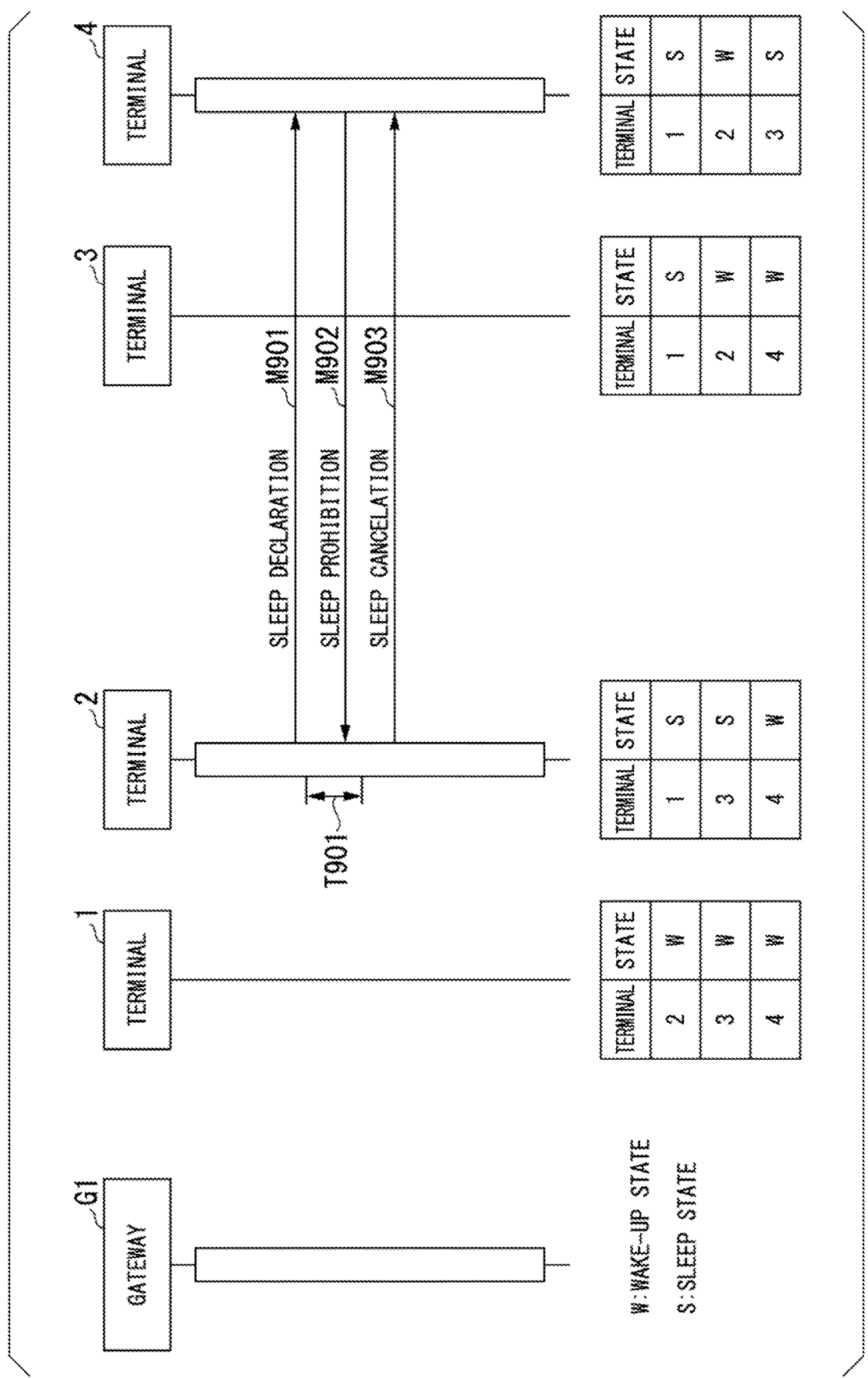
FIG. 9 is a diagram showing a communication sequence in the network according to the embodiment of the present invention.

FIG. 9 shows a communication sequence when the terminal 2 declares sleep while the terminal 1 and the terminal 3 are sleeping. The terminal 2 transmits a sleep-declaration packet M901 by broadcasting. Since the terminal 1 and the terminal 3 are sleeping, the terminal 1 and the terminal 3 do not receive the sleep-declaration packet M901. The terminal 4 receives the sleep-declaration packet M901. The communication path for the terminal 4 to send a packet to the gateway G1 is only the path passing through the terminal 2 at present. If the terminal 2 goes into the sleep state, the terminal 4 loses the communication path. Therefore, the terminal 4 immediately transmits a sleep-prohibition packet M902 by broadcasting. The sleep-prohibition packet M902 indicates prohibition of sleep for the adjacent terminal that has transmitted the sleep-declaration packet M901.

The terminal 2 receives the sleep-prohibition packet M902 from the terminal 4 in a response-waiting time T901. Therefore, the terminal 2 transmits a sleep-cancelation packet M903 by broadcasting. The sleep-cancelation packet M903 indicates cancelation of the sleep declaration. The state information of the adjacent terminal managed by each terminal is not changed.

Figure 10:
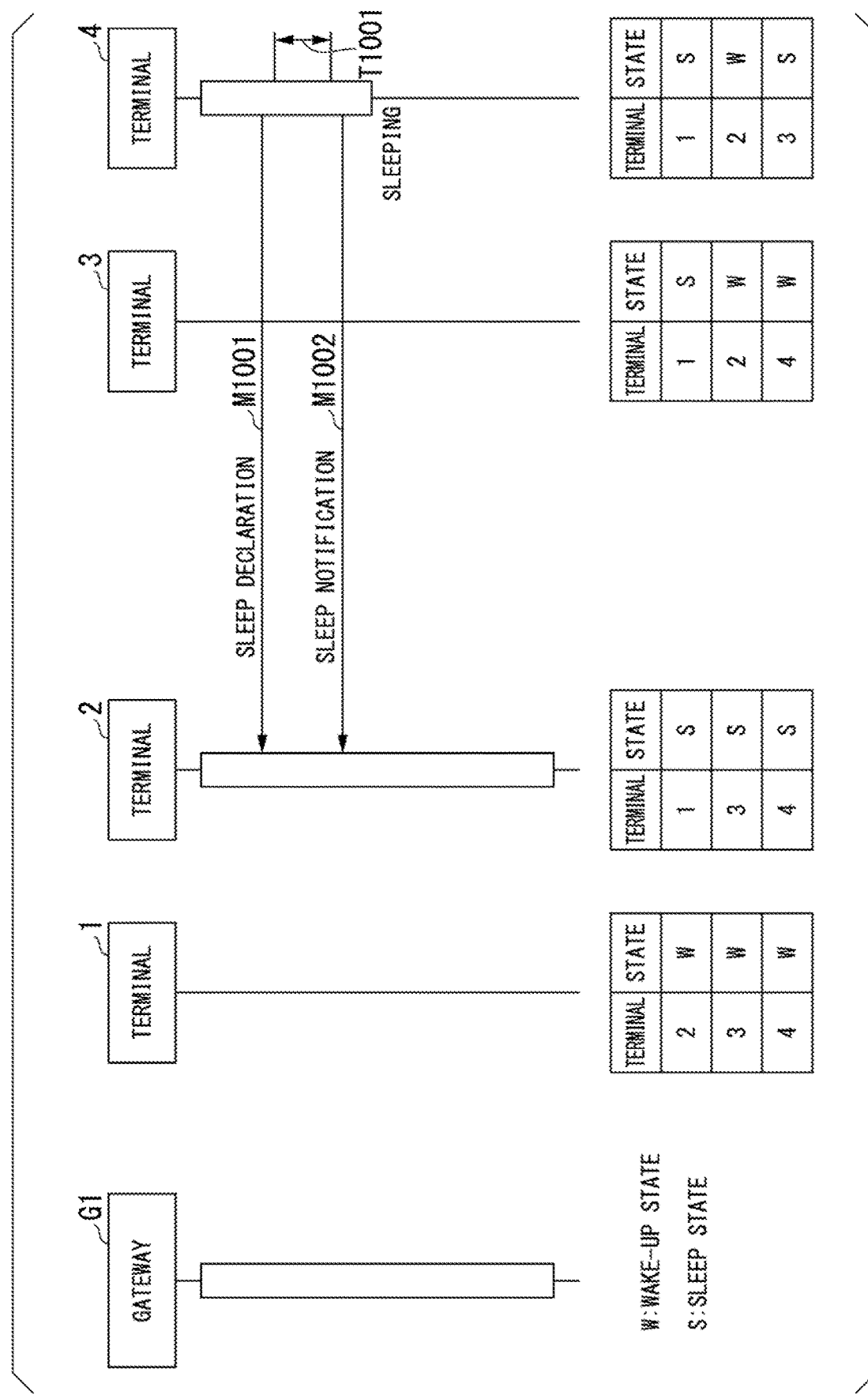
FIG. 10 is a diagram showing a communication sequence in the network according to the embodiment of the present invention.

FIG. 10 shows a communication sequence when the terminal 4 declares sleep while the terminal 1 and the terminal 3 are sleeping. The terminal 4 transmits a sleep-declaration packet M1001 by broadcasting. Since the terminal 1 and the terminal 3 are sleeping, the terminal 1 and the terminal 3 do not receive the sleep-declaration packet M1001. The terminal 2 receives the sleep-declaration packet M1001. The path for sending a packet from the terminal 2 to the gateway G1 has been secured. Therefore, the terminal 2 does not respond to the sleep-declaration packet M1001. The terminal 4 waits for a response for a response-waiting time T1001. A response is not received from the adjacent terminals of the terminal 4 in the response-waiting time T1001. Therefore, the terminal 4 transmits a sleep-notification packet M1002 by broadcasting and goes into the sleep state. The terminal 2 stores the state information that indicates that the terminal 4 is sleeping on the memory 304 after receiving the sleep-notification packet M1002. The state information after the terminal 4 goes into the sleep state is shown in FIG. 10.

Figure 11:
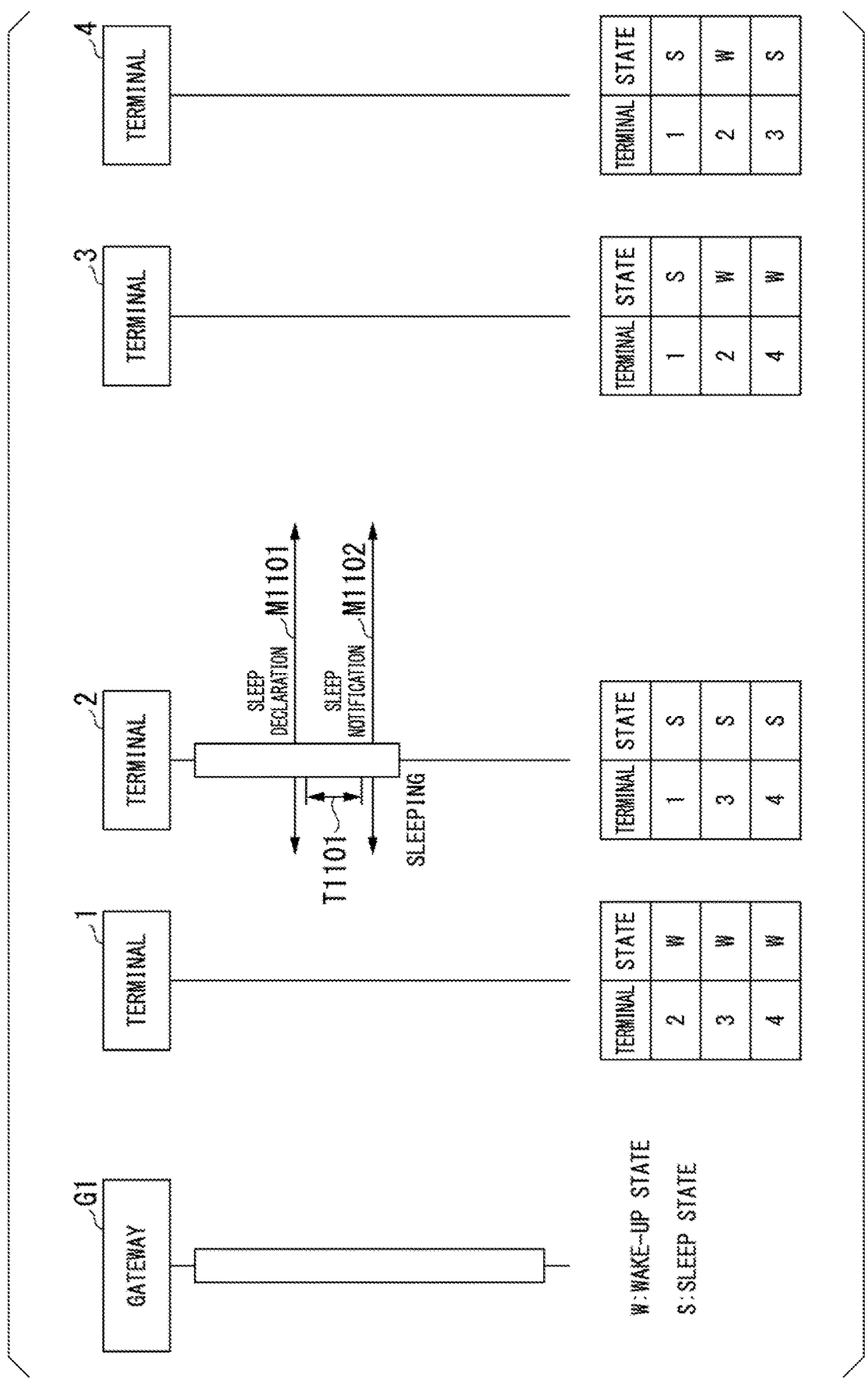
FIG. 11 is a diagram showing a communication sequence in the network according to the embodiment of the present invention.

FIG. 11 shows a communication sequence when the terminal 2 goes into the sleep state while the terminal 1, the terminal 3, and the terminal 4 are sleeping. The terminal 2 transmits a sleep-declaration packet M101 by broadcasting and waits for a response for a response-waiting time T1101. Since all the adjacent terminals are sleeping, a response is not received from the adjacent terminals of the terminal 2. Therefore, the terminal 2 transmits a sleep-notification packet M1102 by broadcasting and goes into the sleep state. The state information of the adjacent terminal managed by each terminal is not changed. When the terminal 2 is able to determine that all the adjacent terminals are sleeping on the basis of the state information of the adjacent terminal, the terminal 2 may go into the sleep state without transmitting a sleep-declaration packet or the like.

Figure 12:
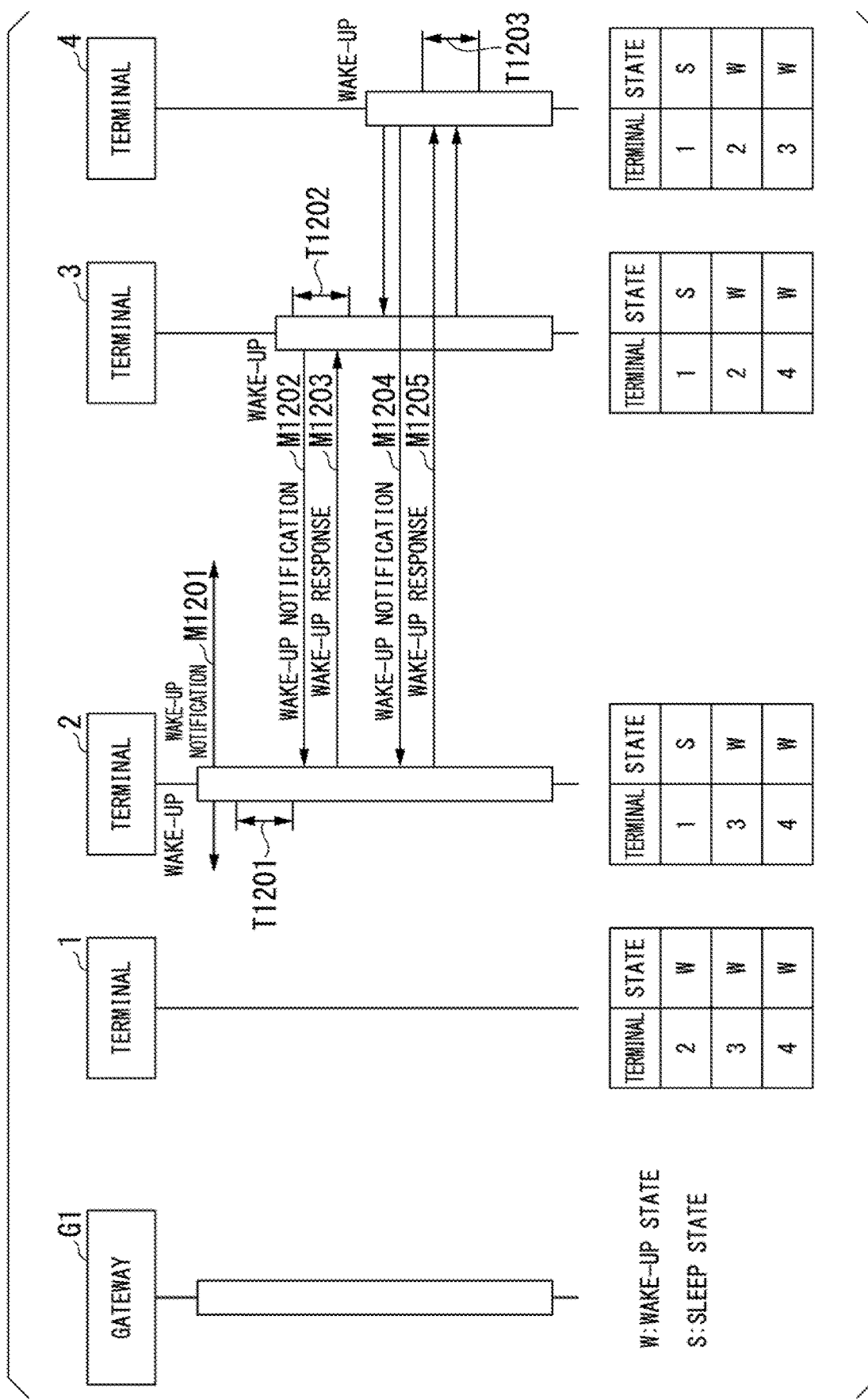
FIG. 12 is a diagram showing a communication sequence in the network according to the embodiment of the present invention.

FIG. 12 shows a communication sequence when the terminal 2, the terminal 3, and the terminal 4 wake up in turn after the terminals 1 to 4 go into the sleep state. First, the terminal 2 wakes up. Sleep time of each terminal is added to the sleep-notification packet transmitted when the terminal 3 and the terminal 4 go into the sleep state. Details of this will be described later. When the terminal 2 goes into the sleep state, setting for the terminal 2 to wake up earlier than the terminal 3 and the terminal 4 is performed. The terminal 3 and the terminal 4 are the lower-rank terminals of the terminal 2.

After the terminal 2 wakes up, the terminal 2 transmits a wake-up notification packet M1201 by broadcasting and waits for a response for a response-waiting time T1201. Since all the adjacent terminals of the terminal 2 are sleeping, a response is not received from the adjacent terminals of the terminal 2 in the response-waiting time T1201. Then, the terminal 3 wakes up. The terminal 3 transmits a wake-up notification packet M1202 by broadcasting and waits for a response for a response-waiting time T1202.

The terminal 2 receives the wake-up notification packet M1202. Since the terminal 2 understands that the terminal 3 has woken up, the terminal 2 stores the state information that indicates that the terminal 3 is awake on the memory 304. Furthermore, the terminal 2 transmits a wake-up response packet M1203 by broadcasting. The terminal 3 receives the wake-up response packet M1203. Since the terminal 3 understands that the terminal 2 is awake, the terminal 3 stores the state information that indicates that the terminal 2 is awake on the memory 304.

Then, the terminal 4 wakes up. The terminal 4 transmits a wake-up notification packet M1204 by broadcasting and waits for a response for a response-waiting time T1203. The terminal 2 and the terminal 3 receive the wake-up notification packet M1204. Since the terminal 2 and the terminal 3 understand that the terminal 4 has woken up, the terminal 2 and the terminal 3 store the state information that indicates that the terminal 4 is awake on the memory 304. Furthermore, the terminal 2 and the terminal 3 transmit a wake-up response packet M1205 by broadcasting. The terminal 4 receives the wake-up response packet M1205 transmitted from each of the terminal 2 and the terminal 3. Since the terminal 4 understands that the terminal 2 and the terminal 3 are awake, the terminal 4 stores the state information that indicates that the terminal 2 and the terminal 3 are awake on the memory 304. The state information after the terminal 2, the terminal 3, and the terminal 4 wake up is shown in FIG. 12.

Figure 13:
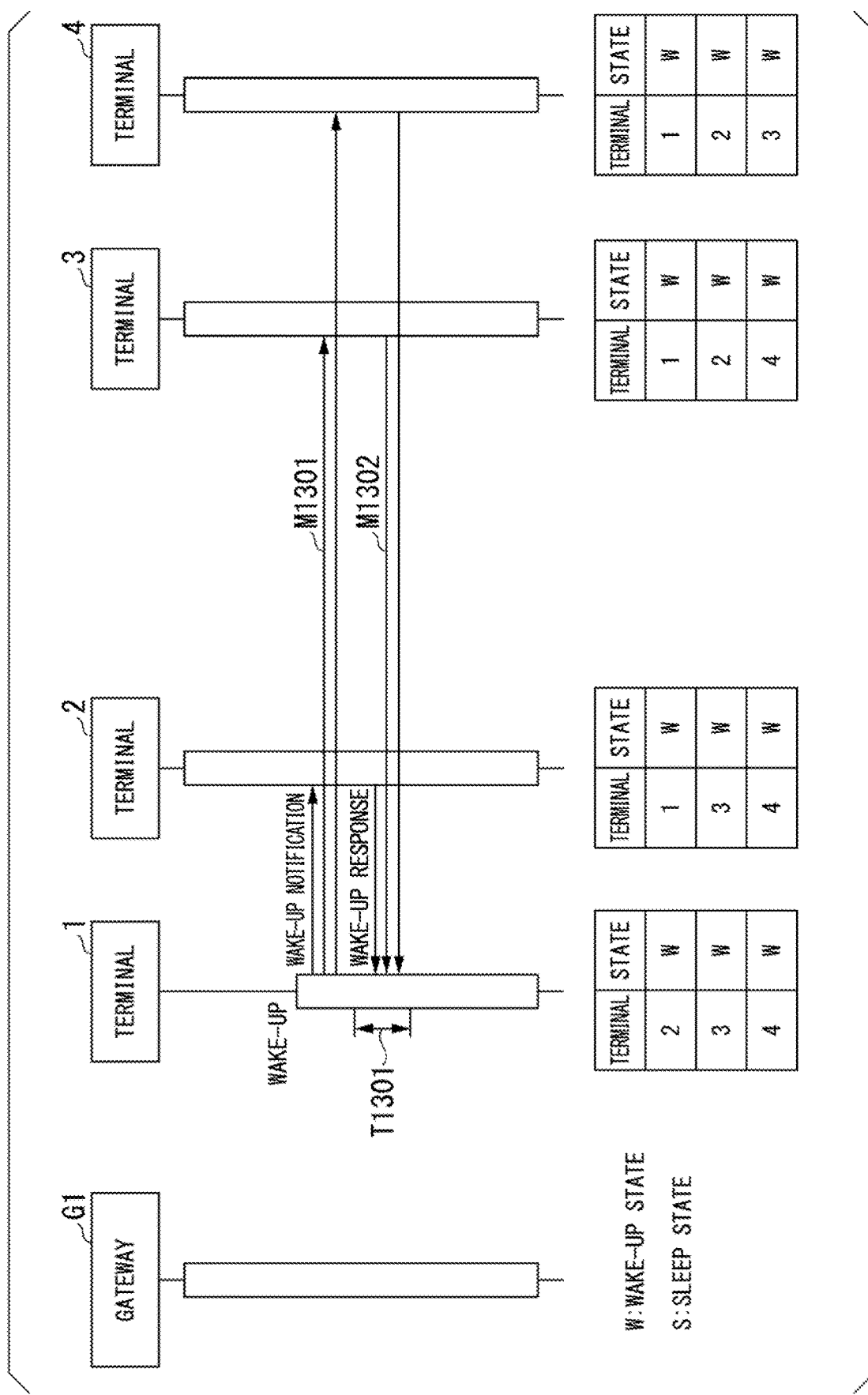
FIG. 13 is a diagram showing a communication sequence in the network according to the embodiment of the present invention.

FIG. 13 shows a communication sequence when the terminal 1 wakes up after the terminal 1 goes into the sleep state and the terminals 2 to 4 wake up. The terminal 1 wakes up. The terminal 1 transmits a wake-up notification packet M1301 by broadcasting and waits for a response for a response-waiting time T1301. The terminals 2 to 4 receive the wake-up notification packet M1301 transmitted from the terminal 1. Therefore, the terminals 2 to 4 understand that the terminal 1 is awake. The terminals 2 to 4 store the state information that indicates that the terminal 1 is awake on the memory 304 and transmit a wake-up response packet M1302 by broadcasting. The terminal 1 receives the wake-up response packet M1302 transmitted from each of the terminals 2 to 4. Since the terminal 1 understands that the terminals 2 to 4 are awake, the terminal 1 stores the state information that indicates that the terminals 2 to 4 are awake on the memory 304. The state information after the terminal 1 wakes up is shown in FIG. 13.

Figure 14:
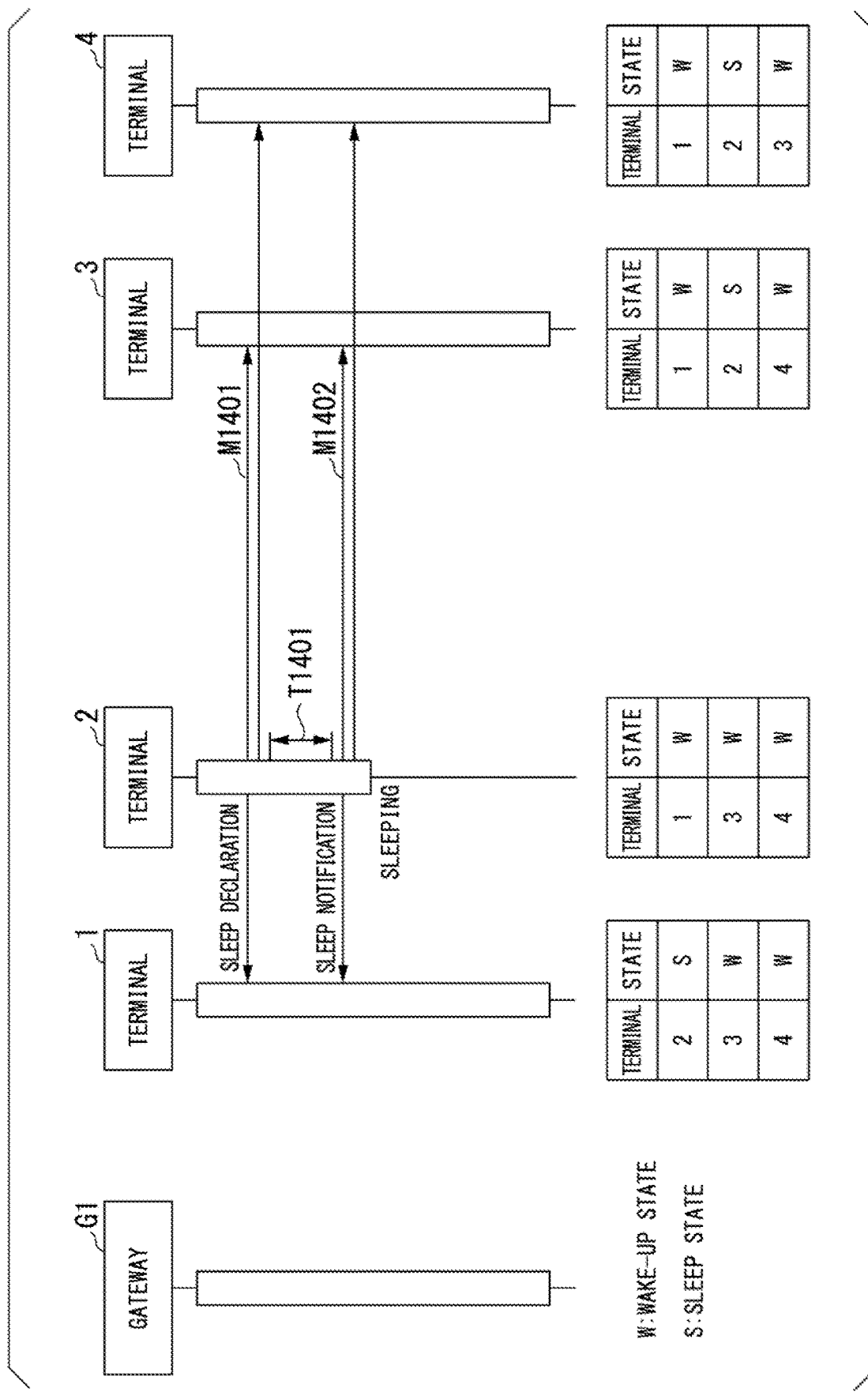
FIG. 14 is a diagram showing a communication sequence in the network according to the embodiment of the present invention.

FIG. 14 shows a communication sequence when the terminal 2 goes into the sleep state while the terminals 1 to 4 are awake. The terminal 3 and the terminal 4 are the lower-rank terminals of the terminal 2. Therefore, there is a case in which the terminal 2 is unable to sleep for the sake of the lower-rank terminal. Such an example was described with reference to FIG. 9.

When the terminal 2 can go into the sleep state anytime, the terminal 2 transmits a sleep-declaration packet M1401 by broadcasting on the basis of wake-up by the terminal 1 as with the example shown in FIG. 13 and waits for a response for a response-waiting time T1401. In the network N1 shown in FIG. 1, the terminal 3 and the terminal 4 can send a packet to the gateway G1 via the terminal 1. Since the communication path has been secured, the terminal 3 and the terminal 4 do not respond to the sleep-declaration packet M1401 transmitted from the terminal 2.

The terminal 2 confirms that the response does not return from the adjacent terminals of the terminal 2. The terminal 2 transmits a sleep-notification packet M1402 by broadcasting and goes into the sleep state. The terminal 1, the terminal 3, and the terminal 4 receive the sleep-notification packet M1402 transmitted from the terminal 2. Since the terminal 1, the terminal 3, and the terminal 4 understand that the terminal 2 has gone into the sleep state, the terminal 1, the terminal 3, and the terminal 4 store the state information that indicates that the terminal 2 is sleeping on the memory 304. The state information after the terminal 2 goes into the sleep state is shown in FIG. 14.

(Basic Processing of Terminal)

Figure 15:
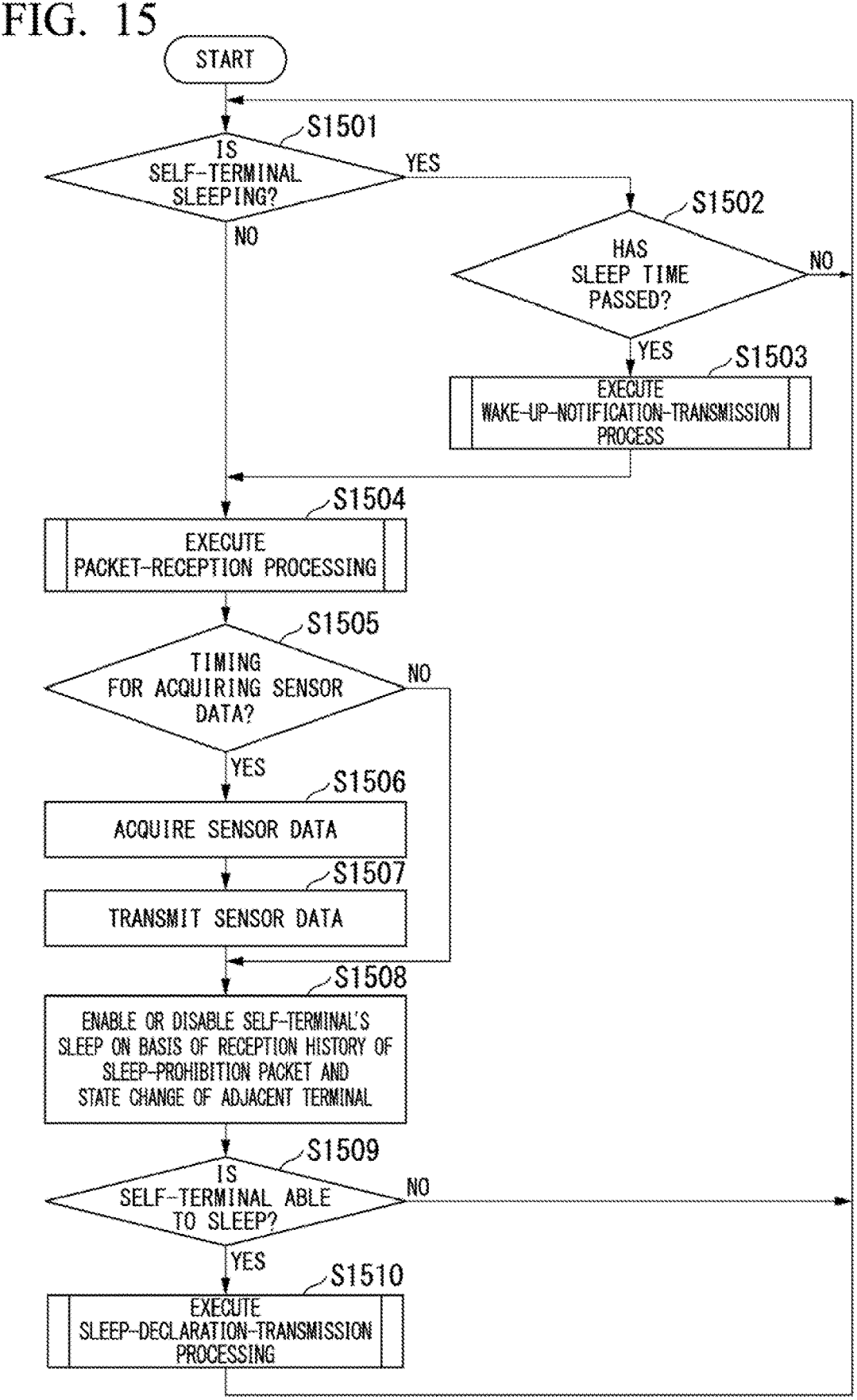
FIG. 15 is a flow chart showing a procedure of basic processing executed by the terminal according to the embodiment of the present invention.

The processing executed by the terminals 1 to 4 will be described. FIG. 15 shows a procedure of basic processing periodically executed by each terminal. The system of each terminal goes into any one of the wake-up state and the sleep state. While the system operates, the controller 301 always determines whether the state of the self-terminal is the wake-up state or the sleep state (Step S1501).

When the controller 301 determines that the self-terminal is sleeping in Step S1501, the controller 301 determines whether or not a sleep time has passed since the self-terminal started sleeping (Step S1502). For example, a period of time such as ten minutes or one hour is set to each terminal as the sleep time. The memory 304 stores the set sleep time. When the controller 301 determines that the sleep time has not passed in Step S1502, the processing in Step S1501 is executed. In this case, the controller 301 repeatedly monitors passage of time.

When the controller 301 determines that the sleep time has passed in Step S1502, the controller 301 executes wake-up-notification-transmission processing (Step S1503). The wake-up-notification-transmission processing will be described later with reference to FIG. 21. When the controller 301 determines that the self-terminal is awake in Step S1501, the controller 301 executes packet-reception processing (Step S1504). The packet-reception processing will be described later with reference to FIG. 16. The controller 301 also executes the packet-reception processing (Step S1504) after Step S1503.

After Step S1504, the controller 301 determines whether or not the current time point is the timing for acquiring sensor data (Step S1505). The controller 301 acquires sensor data from the sensor 303 on a regular basis. When the controller 301 determines that the current time point is not the timing for acquiring sensor data in Step S1505, the processing in Step S1508 is executed. The processing in Step S1508 will be described later.

When the controller 301 determines that the current time point is the timing for acquiring sensor data in Step S1505, the controller 301 acquires sensor data from the sensor 303 (Step S1506). After Step S1506, the controller 301 causes the communicator 302 to transmit the sensor data by broadcasting (Step S1507).

After Step S1507, the controller 301 enables or disables the self-terminal's sleep on the basis of the reception history of the sleep-prohibition packet and the state change of the adjacent terminal. When the self-terminal receives the sleep-prohibition packet from the adjacent terminal, the memory 304 stores the reception history of the sleep-prohibition packet. The reception history of the sleep-prohibition packet includes a time point at which the sleep-prohibition packet is received. When the reception history of the sleep-prohibition packet is not stored on the memory 304, the controller 301 enables the self-terminal's sleep on the basis of the execution status in Step S1507. When the sensor data are being transmitted in Step S1507, the controller 301 enables the self-terminal's sleep. When the reception history of the sleep-prohibition packet is stored on the memory 304, the controller 301 determines the state change of the adjacent terminal on the basis of the state information of the adjacent terminal stored on the memory 304. In a case in which the state change of the adjacent terminal has occurred, the controller 301 enables the self-terminal's sleep. In a case in which the state change of the adjacent terminal has not occurred, the controller 301 disables the self-terminal's sleep (Step S1508).

For example, since the same-rank terminal of the terminal 1 is sleeping, the terminal 1 receives the sleep-prohibition packet from the lower-rank terminal of the self-terminal. The terminal 1 has lost an opportunity to sleep because the terminal 1 has received the sleep-prohibition packet. There is a case in which the terminal 1 is able to understand that the same-rank terminal has woken up. In such a case, the state change of the adjacent terminal occurs. In such a case, the self-terminal may sleep. Also, in a case in which the terminal 1 is able to understand that all the lower-rank terminals of the self-terminal have gone into the sleep state, the state change of the adjacent terminal occurs.

After Step S1508, the controller 301 determines whether or not the self-terminal is able to sleep (Steps S1509). When the controller 301 determines that the self-terminal is unable to sleep in Step S1509, the processing in Step S1501 is executed. When the controller 301 determines that the self-terminal is able to sleep in Step S1509, the controller 301 executes sleep-declaration-transmission processing (Step S1510). The sleep-declaration-transmission processing will be described later with reference to FIG. 18. After Step S1510, the processing in Step S1501 is executed.

(Packet-Reception Processing)

Figure 16:
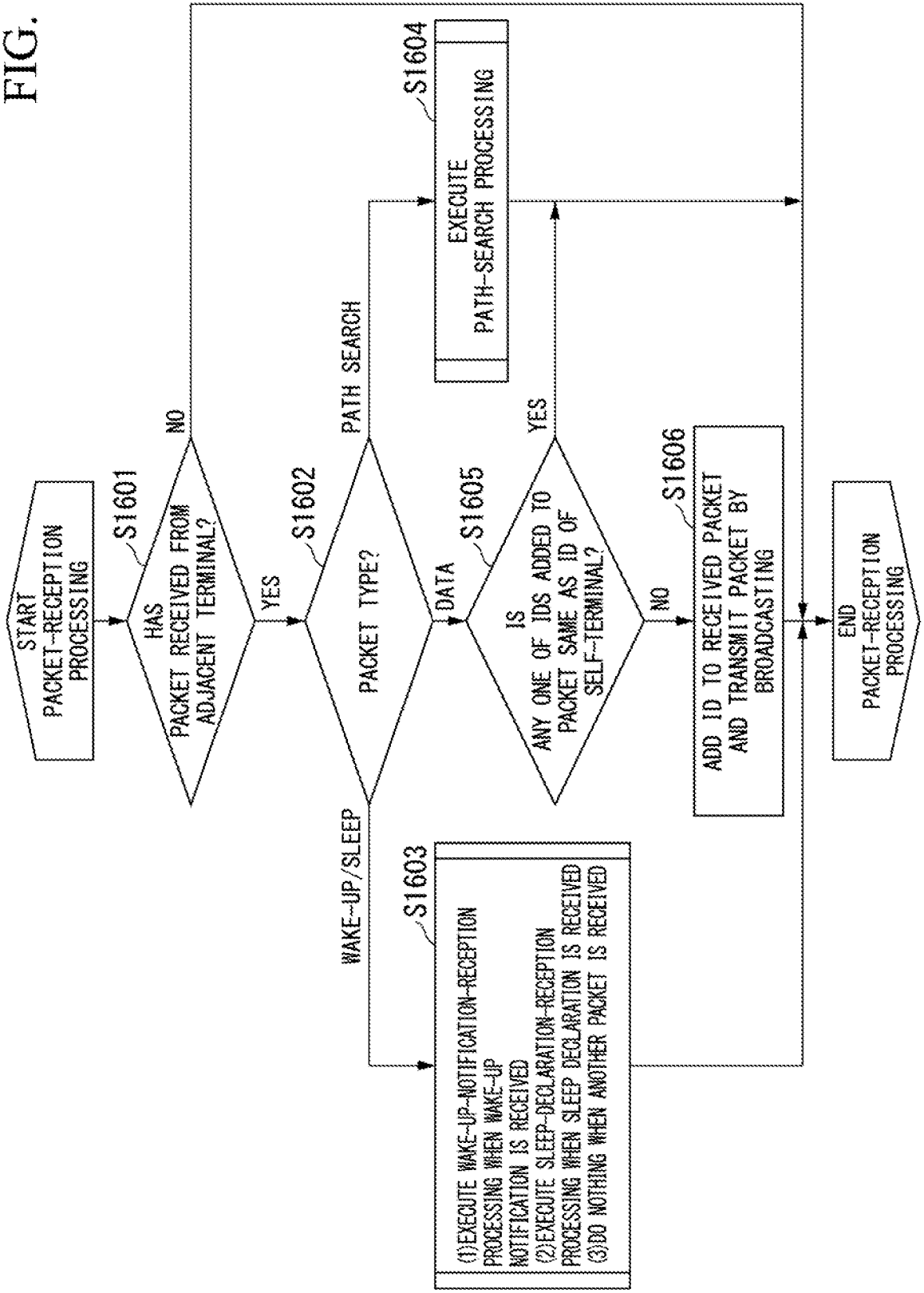
FIG. 16 is a flow chart showing a procedure of packet-reception processing executed by the terminal according to the embodiment of the present invention.

FIG. 16 shows a procedure of the packet-reception processing executed in Step S1504 shown in FIG. 15. The controller 301 monitors the state of the communicator 302 and determines whether or not the communicator 302 has received a packet from the adjacent terminal (Step S1601). When the controller 301 determines that the communicator 302 has not received a packet in Step S1601, the controller 301 completes the packet-reception processing. When the controller 301 determines that the communicator 302 has received a packet in Step S1601, the controller 301 determines the type of the received packet (Step S1602).

The controller 301 determines the type of the packet on the basis of the value of the type code added to the packet in Step S1602. When the type of the packet relates to wake-up or sleep and is the wake-up notification, the controller 301 executes wake-up-notification-reception processing. When the type of the packet relates to wake-up or sleep and is the sleep declaration, the controller 301 executes sleep-declaration-reception processing (Step S1603). When the type of the packet is another packet related to wake-up or sleep, the controller 301 completes the packet-reception processing without executing the processing in Step S1603. The wake-up-notification-reception processing will be described later with reference to FIG. 22. The sleep-declaration-reception processing will be described later with reference to FIG. 19.

When the type of the packet is data, the controller 301 determines whether or not any one of the IDs added to the packet is the same as the ID of the self-terminal (Step S1605). When any one of the IDs added to the packet is the same as the ID of the self-terminal, that is, the ID of the self-terminal is added to the packet, the self-terminal has completed transmission of the packet. In such a case, the controller 301 completes the packet-reception processing. When all the IDs added to the packet are different from the ID of the self-terminal, that is, the ID of the self-terminal is not added to the packet, the controller 301 adds the ID of the self-terminal to the received packet. The controller 301 causes the communicator 302 to transmit the packet by broadcasting (Step S1606). When the processing in Step S1606 is executed, the controller 301 completes the packet-reception processing.

When the type of the packet is the path search, the controller 301 executes path-search processing (Step S1604). The path-search processing will be described later with reference to FIG. 17. When the processing in Step S1604 is executed, the controller 301 completes the packet-reception processing.

(Path-Search Processing)

Figure 17:
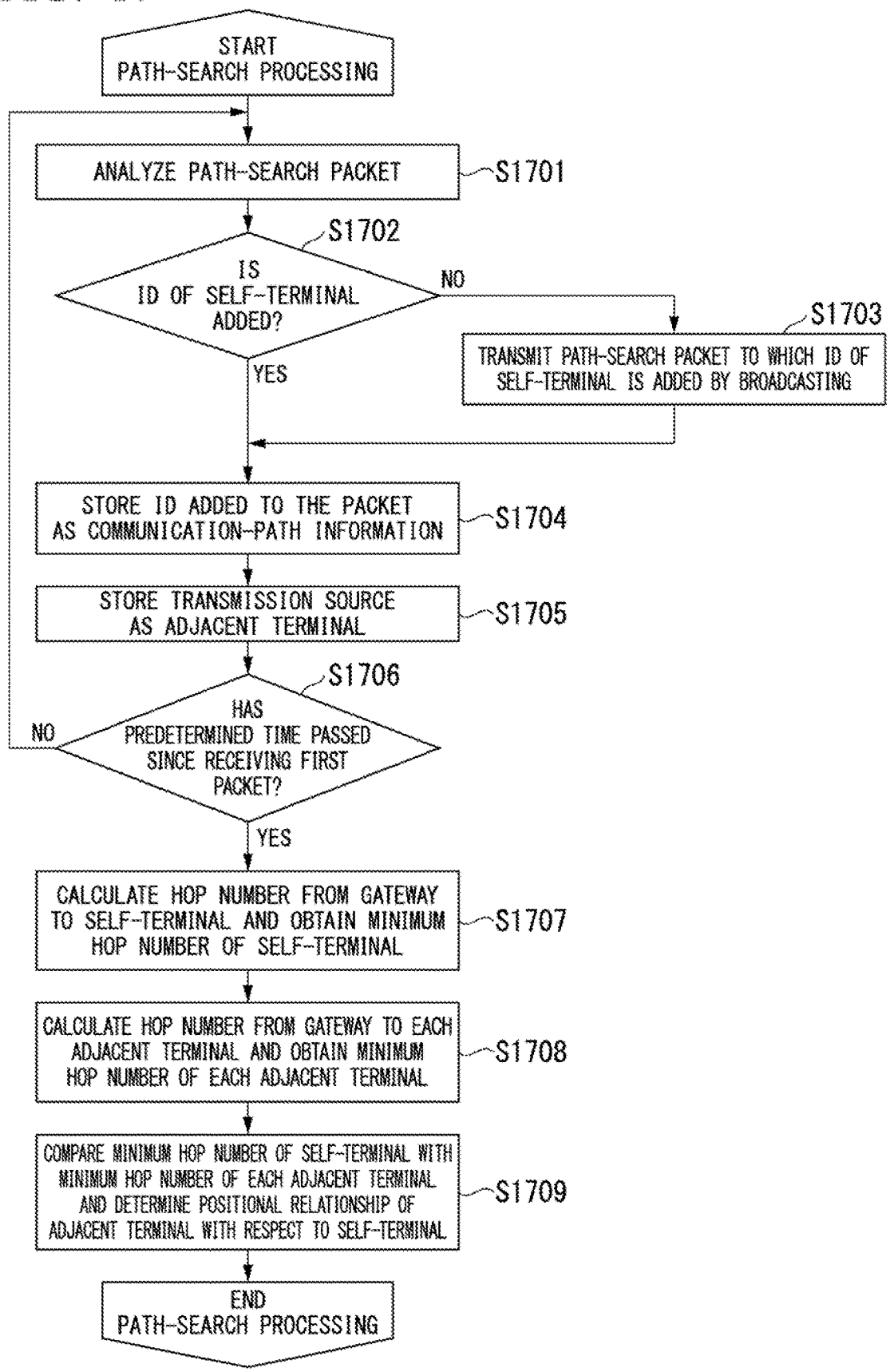
FIG. 17 is a flow chart showing a procedure of path-search processing executed by the terminal according to the embodiment of the present invention.

FIG. 17 shows a procedure of the path-search processing executed in Step S1604 shown in FIG. 16. The controller 301 analyzes the received path-search packet. Specifically, the controller 301 extracts the IDs added to the path-search packet. When a plurality of IDs are added to the path-search packet, the controller 301 extracts all the IDs (Step S1701). When the path-search packet is first received after the system of the self-terminal is activated, the controller 301 records the time point at which the path-search packet is received.

After Step S1701, the controller 301 determines whether or not any one of the extracted IDs is the same as the ID of the self-terminal (Step S1702). When any one of the extracted IDs is the same as the ID of the self-terminal, that is, the ID of the self-terminal is added to the path-search packet, the processing in Step S1704 is executed. The processing in Step S1704 will be described later.

When all the extracted IDs are different from the ID of the self-terminal, that is, the ID of the self-terminal is not added to the path-search packet, the controller 301 adds the ID of the self-terminal to the path-search packet. The controller 301 causes the communicator 302 to transmit the path-search packet by broadcasting (Step S1703). In a case in which the adjacent terminal of the self-terminal is awake, the adjacent terminal receives the path-search packet transmitted from the self-terminal. There is a case in which another adjacent terminal different from the adjacent terminal transmitting the path-search packet to the self-terminal receives the path-search packet from the self-terminal.

After Step S1703, the controller 301 stores the ID added to the path-search packet on the memory 304 as the communication-path information (Step S1704). The communication-path information includes one or a plurality of IDs. In a case in which the communication-path information includes a plurality of IDs, the order of the IDs added to the path-search packet is maintained in the communication-path information.

In a case in which the self-terminal receives the path-search packet from the gateway G1, no ID has been added to the path-search packet. In the embodiment of the present invention, the ID of the self-terminal is added at the end of the line of IDs included in the communication-path information. Whether the ID of the self-terminal is added to the communication-path information or not may depend on the implementation of the system. In a case in which the self-terminal receives the path-search packet directly from the gateway G1, the ID included in the communication-path information is only the ID of the self-terminal. In a case in which only the ID of the self-terminal is included in the communication-path information, the controller 301 can confirm later that the self-terminal has received the path-search packet directly from the gateway G1. For example, in a case in which the terminal 3 receives the path-search packet via the gateway G1 and the terminal 1, the ID of the terminal 1 and the ID of the terminal 3 are included in the communication-path information. The controller 301 of the terminal 3 can understand that the ID of the terminal 1 is at the beginning and the ID of the terminal 3 is at the end and therefore can confirm later that the path-search packet has arrived via the terminal 1.

The transmission source of the path-search packet is the adjacent terminal of the self-terminal. After Step S1704, the controller 301 stores the transmission source ID as the adjacent terminal on the memory 304 (Step S1705).

In order to repeat reception processing of the path-search packet until a predetermined time has passed, the controller 301 calculates the length of time that has passed since receiving the first path-search packet. After Step S1705, the controller 301 determines whether or not a predetermined time has passed (Step S1706). The predetermined time is, for example, ten seconds. When the controller 301 determines that the predetermined time has not passed in Step S1706, the processing in Step S1701 is executed. Accordingly, the controller 301 repeatedly executes the processing in each of Steps S1701 to S1706 until the predetermined time passes.

When the controller 301 determines that the predetermined time has passed in Step S1706, the controller 301 calculates a hop number of the self-terminal on the basis of one or more pieces of the communication-path information stored on the memory 304. The hop number of the self-terminal is the number of terminals through which a packet passes on the communication path from the gateway G1 to the self-terminal. In other words, the hop number of the self-terminal is the number of terminals that are present between the gateway G1 and the self-terminal on the communication path. The controller 301 obtains the minimum value of the calculated hop number, that is, the minimum hop number (Step S1707).

In a case in which a plurality of communication paths from the gateway G1 to the terminal 1 are present and the communication-path information includes the communication path on which a packet reaches the terminal 1 directly from the gateway G1, the minimum hop number of the terminal 1 is zero. In a case in which a plurality of communication paths from the gateway G1 to the terminal 3 are present and the communication-path information includes the communication path on which a packet passes through the gateway G1, the terminal 1, and the terminal 3 in this order, the minimum hop number of the terminal 3 is one.

After Step S1707, the controller 301 calculates a hop number of each adjacent terminal on the basis of the one or more pieces of the communication-path information stored on the memory 304. The hop number of the adjacent terminal is the number of terminals through which a packet passes on the communication path from the gateway G1 to the adjacent terminal of the self-terminal. In other words, the hop number of the adjacent terminal is the number of terminals that are present between the gateway G1 and the adjacent terminal on the communication path. The controller 301 obtains the minimum value of the calculated hop number, that is, the minimum hop number for each adjacent terminal of the self-terminal (Step S1708).

For example, in the network N1 shown in FIG. 1, the communication path of the packet reaching the terminal 3 includes at least the following communication paths. In the following communication paths, the order of each terminal is the same as the order of terminals through which the packet passes.

First communication path: the gateway G1, the terminal 1, and the terminal 3

Second communication path: the gateway G1, the terminal 2, and the terminal 3

Third communication path: the gateway G1, the terminal 1, the terminal 2, and the terminal 3

Fourth communication path: the gateway G1, the terminal 1, the terminal 4, and the terminal 3

Fifth communication path: the gateway G1, the terminal 2, the terminal 1, and the terminal 3

Sixth communication path: the gateway G1, the terminal 2, the terminal 4, and the terminal 3

According to the above-described communication paths, the terminal 3 can understand that the terminal 1, the terminal 2, and the terminal 4 are the adjacent terminals of the terminal 3. The terminal 3 can understand that the minimum hop number of the terminal 1 is zero on the basis of the first, third, and fourth communication paths. The terminal 3 can understand that the minimum hop number of the terminal 2 is zero on the basis of the second, fifth, and sixth communication paths. The terminal 3 can understand that the minimum hop number of the terminal 4 is one on the basis of the fourth and sixth communication paths.

The controller 301 compares the minimum hop number of the self-terminal with the minimum hop number of the adjacent terminal for each adjacent terminal. The controller 301 determines the positional relationship of the adjacent terminal with respect to the self-terminal on the basis of the result of comparison. This positional relationship is determined on the basis of the degree of proximity to the gateway G1. The positional relationship of the adjacent terminal indicates that the adjacent terminal is in any one of the upper rank, the same rank, and the lower rank with respect to the self-terminal.

In a case in which the minimum hop number of the adjacent terminal is less than the minimum hop number of the self-terminal, the adjacent terminal is the upper-rank terminal of the self-terminal. In a case in which the minimum hop number of the adjacent terminal is the same as the minimum hop number of the self-terminal, the adjacent terminal is the same-rank terminal of the self-terminal. In a case in which the minimum hop number of the adjacent terminal is greater than the minimum hop number of the self-terminal, the adjacent terminal is the lower-rank terminal of the self-terminal. The controller 301 stores the determined positional relationship on the memory 304 as the adjacent terminal information (Step S1709). For example, the terminal 1 and the terminal 2 are in the upper rank with respect to the terminal 3. The terminal 4 is in the same rank with respect to the terminal 3. When the processing in Step S1709 is executed, the controller 301 completes the path-search processing.

(Sleep-Declaration-Transmission Processing)

Figure 18:
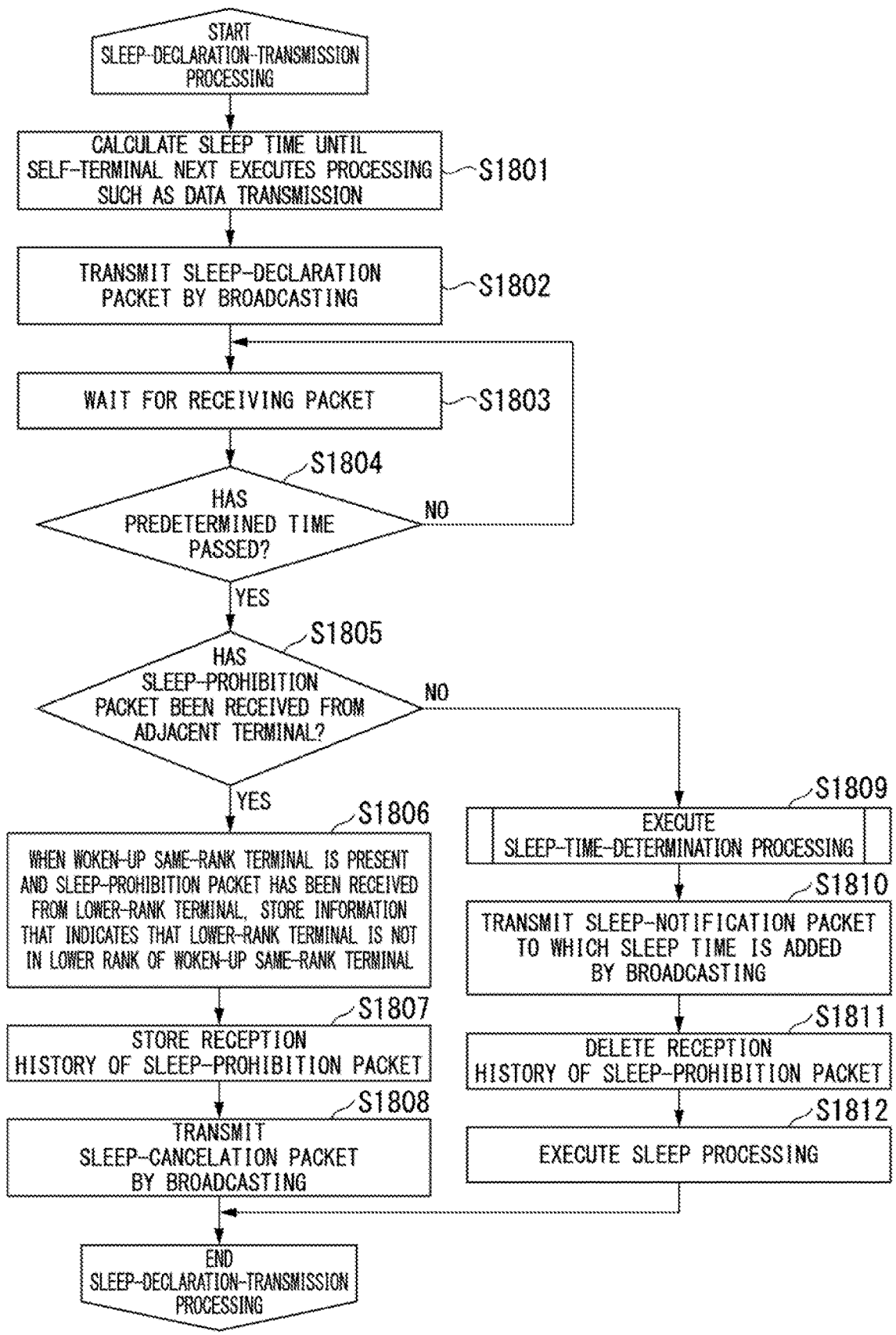
FIG. 18 is a flow chart showing a procedure of sleep-declaration-transmission processing executed by the terminal according to the embodiment of the present invention.

FIG. 18 shows a procedure of the sleep-declaration-transmission processing executed in Step S1510 shown in FIG. 15. The controller 301 confirms the time point at which the self-terminal next starts the processing of transmitting a data packet including the sensor data acquired from the sensor 303. The controller 301 calculates the sleep time on the basis of the confirmed time point and the current time point (Step S1801). For example, the sleep time is the difference between the two time points.

After Step S1801, the controller 301 adds the calculated sleep time to the sleep-declaration packet as a scheduled sleep time. The controller 301 causes the communicator 302 to transmit the sleep-declaration packet by broadcasting (Step S1802).

After Step S1802, the controller 301 monitors the communicator 302 and waits for receiving a packet (Step S1803). After Step S1803, the controller 301 determines whether or not a predetermined time has passed since transmitting the sleep-declaration packet (Step S1804). When the controller 301 determines that the predetermined time has not passed in Step S1804, the processing in Step S1803 is executed.

When the controller 301 determines that the predetermined time has passed in Step S1804, the controller 301 determines whether or not the sleep-prohibition packet has been received from the adjacent terminal within the predetermined time (Step S1805). When the same-rank terminal in the wake-up state is present and the self-terminal has received the sleep-prohibition packet from the lower-rank terminal of the self-terminal, the controller 301 can determine that the lower-rank terminal is not in the lower rank of the same-rank terminal in the wake-up state. In such a case, the controller 301 adds information of the case as non-subordination relationship to the adjacent terminal information stored on the memory 304 (Step S1806). This information is used for determining whether or not the self-terminal can go into the sleep state when both the self-terminal and the same-rank terminal desire to sleep. The determination will be described later with reference to FIG. 20. In a case other than the above-described case, the processing is not executed in Step S1806.

After Step S1806, the controller 301 stores the reception history of the sleep-prohibition packet on the memory 304 (Step S1807). This reception history is used in Step S1508 shown in FIG. 15. After Step S1807, the controller 301 causes the communicator 302 to transmit the sleep-prohibition packet by broadcasting (Step S1808). When the processing in Step S1808 is executed, the sleep-declaration-transmission processing is completed.

When the controller 301 determines that the sleep-prohibition packet has not been received within the predetermined time in Step S1805, the controller 301 executes sleep-time-determination processing (Step S1809). The sleep-time-determination processing will be described later with reference to FIG. 23. After Step S1809, the controller 301 adds the sleep time to the sleep-notification packet. The sleep time is determined in the sleep-time-determination processing. The controller 301 causes the communicator 302 to transmit the sleep-notification packet by broadcasting (Step S1810).

After Step S1810, the controller 301 deletes the reception history of the sleep-prohibition packet from the memory 304 (Step S1811). When the reception history of the sleep-prohibition packet is not stored on the memory 304, the processing is not executed in Step S1811.

After Step S1811, the controller 301 executes sleep processing. The controller 301 switches the state of the system of the self-terminal to a low power-consumption state by stopping the power supply to the sensor 303 and the communicator 302 in the sleep processing (Step S1812). When the processing in Step S1812 is executed, the sleep-declaration-transmission processing is completed. When the self-terminal receives the sleep-prohibition packet from the adjacent terminal, the self-terminal does not transfer the sleep-prohibition packet.

(Sleep-Declaration-Reception Processing)

Figure 19:
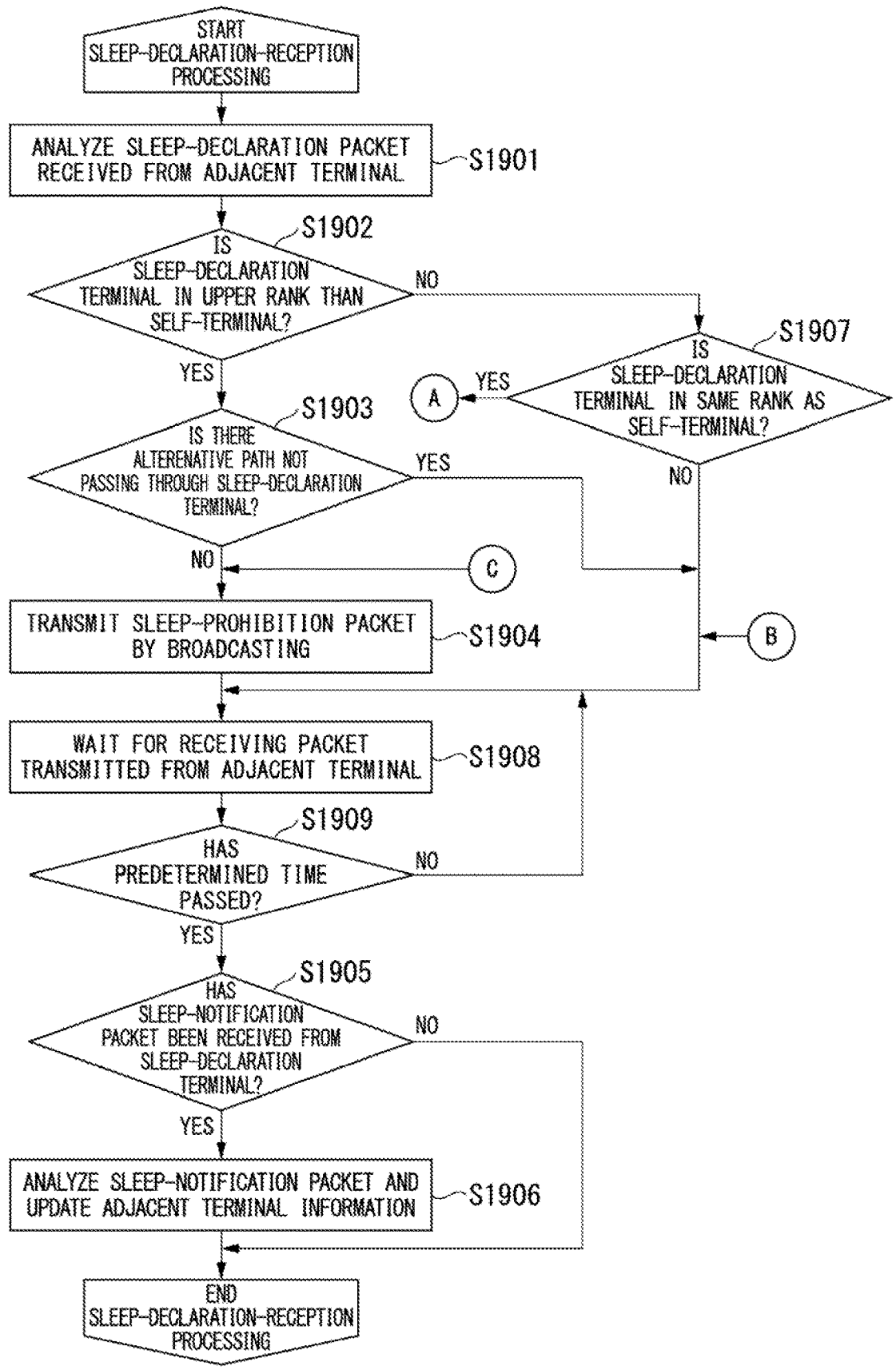
FIG. 19 is a flow chart showing a procedure of sleep-declaration-reception processing executed by the terminal according to the embodiment of the present invention.
Figure 20:
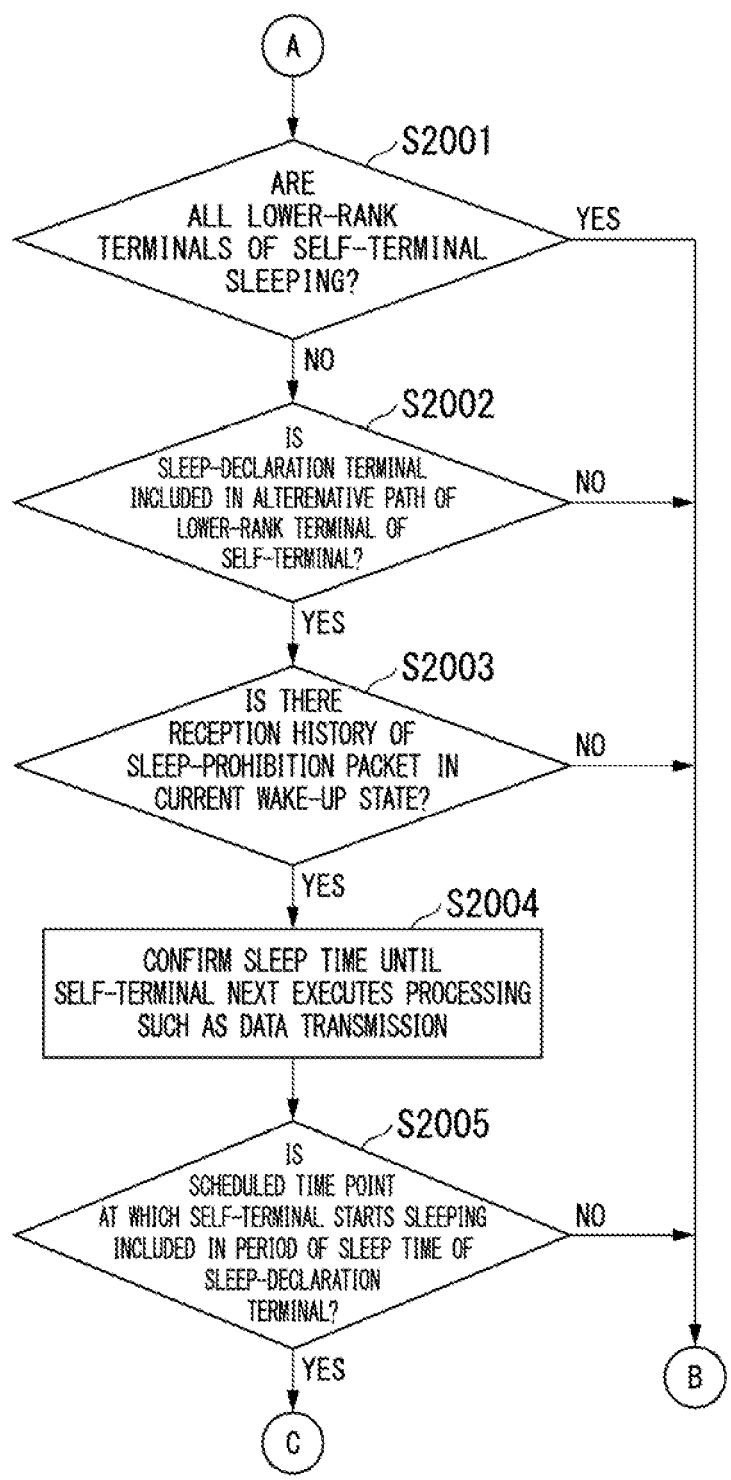
FIG. 20 is a flow chart showing a procedure of sleep-declaration-reception processing executed by the terminal according to the embodiment of the present invention.

FIG. 19 and FIG. 20 show a procedure of the sleep-declaration-reception processing executed in Step S1603 shown in FIG. 16. The controller 301 analyzes the sleep-declaration packet received from the adjacent terminal. Specifically, the controller 301 extracts the ID of the transmission source added to the sleep-declaration packet and identifies the terminal that is the transmission source. In other words, the controller 301 identifies the sleep-declaration terminal (Step S1901).

After Step S1901, the controller 301 compares the ID of each terminal in the positional relationship of the adjacent terminal stored on the memory 304 with the ID of the transmission source of the sleep-declaration packet. In this way, the controller 301 determines whether or not the sleep-declaration terminal is in the upper rank than the self-terminal, that is, the sleep-declaration terminal is the upper-rank terminal (Step S1902).

When the controller 301 determines that the sleep-declaration terminal is in the upper rank than the self-terminal in Step S1902, the controller 301 determines whether or not an alternative path not passing through the sleep-declaration terminal is available (Step S1903). The alternative path is a path passing through the upper-rank terminal other than the sleep-declaration terminal. For example, the case in which the self-terminal is the terminal 3, the sleep-declaration terminal is the terminal 1, and terminals 1 to 4 are in the wake-up state will be described. The upper-rank terminal of the terminal 3 is the terminal 1 and the terminal 2. When the terminal 2 is awake, the packet transmitted from the terminal 3 reaches the gateway G1 via the terminal 2. In this case, the controller 301 of the terminal 3 determines that the alternative path is available. On the other hand, when the terminal 2 is in the sleep state, the controller 301 of the terminal 3 determines that the alternative path is not available. In the embodiment of the present invention, the condition for securing the communication path from each terminal to the gateway G1 is that a packet always reaches the upper-rank terminal of the self-terminal. A packet is not expected to reach the gateway G1 from the self-terminal via the same-rank terminal of the self-terminal or the lower-rank terminal of the self-terminal.

The controller 301 executes first sleep determination by executing the processing in Step S1903. If the upper-rank terminal in the wake-up state other than the sleep-declaration terminal is present, the alternative path is available. At this time, the controller 301 determines that sleep by the sleep-declaration terminal is accepted. Therefore, the sleep-prohibition packet is not transmitted. If the upper-rank terminal in the wake-up state other than the sleep-declaration terminal is not present, the alternative path is not available. At this time, the controller 301 determines that sleep by the sleep-declaration terminal is not accepted. Therefore, the sleep-prohibition packet is transmitted to the sleep-declaration terminal in step S1904 described later.

When the controller 301 determines that the alternative path is available in Step S1903, the controller 301 monitors the communicator 302 and waits for receiving a packet (Step S1908). After Step S1908, the controller 301 determines whether or not a predetermined time has passed since starting the sleep-declaration-reception processing (Step S1909). The predetermined time is, for example, five seconds. When the controller 301 determines that the predetermined time has not passed in Step S1909, the processing in Step S1908 is executed.

When the controller 301 determines that the predetermined time has passed in Step S1909, the controller 301 determines whether or not the sleep-notification packet has been received from the sleep-declaration terminal within the predetermined time (Step S1905). When the controller 301 determines that the sleep-notification packet has not been received in Step S1905, the controller 301 completes the sleep-declaration-reception processing.

When the controller 301 determines that the sleep-notification packet has been received in Step S1905, the controller 301 analyzes the sleep-notification packet. Specifically, the controller 301 extracts the sleep time included in the sleep-notification packet. The controller 301 updates the state information of the sleep-declaration terminal to the sleep state in the adjacent terminal information stored on the memory 304. Furthermore, the controller 301 adds the sleep time of the sleep-declaration terminal to the adjacent terminal information. Therefore, the sleep time of the sleep-declaration terminal is stored on the memory 304 (Step S1906). The sleep time is updated in the adjacent terminal information as time passes in the self-terminal. In other words, the sleep time decreases as time passes.

When the controller 301 determines that the alternative path is not available in Step S1903, the controller 301 causes the communicator 302 to transmit the sleep-prohibition packet to which the ID of the sleep-declaration terminal is added by broadcasting (Step S1904). After Step S1904, the processing in Step S1908 is executed.

The sleep-declaration terminal receives the sleep-prohibition packet (Step S1805). The sleep-declaration terminal transmits the sleep-cancelation packet (Step S1808). The controller 301 confirms that the sleep-cancelation packet has been transmitted and completes the sleep-declaration-reception processing (Step S1905).

After the sleep-prohibition packet is transmitted, each terminal waits for receiving the sleep-cancelation packet in Step S1908 in order to confirm the transaction of communication regarding sleep. Implementation in which the processing of receiving the sleep-cancelation packet is omitted may be applied.

When the controller 301 determines that the sleep-declaration terminal is not in the upper rank than the self-terminal in Step S1902, the controller 301 determines whether or not the sleep-declaration terminal is in the same rank as the self-terminal (Step S1907). When the sleep-declaration terminal is not in the same rank as the self-terminal in Step S1907, the controller 301 determines that the sleep-declaration terminal is the lower-rank terminal. In this case, the processing in Step S1908 is executed.

When the controller 301 determines that the sleep-declaration terminal is in the same rank as the self-terminal in Step S1907, the controller 301 determines whether or not all the lower-rank terminals of the self-terminal are sleeping on the basis of the state information of the adjacent terminal stored on the memory 304 (Step S2001). When the controller 301 determines that all the lower-rank terminals are sleeping in Step S2001, the processing in Step S1908 is executed. In this case, the sleep-prohibition packet is not transmitted. When all the lower-rank terminals of the self-terminal are sleeping, the sleep-declaration terminal can go into the sleep state.

When at least one lower-rank terminal is in the wake-up state in Step S2001, the controller 301 determines whether or not the sleep-declaration terminal is included in the alternative path of the lower-rank terminal of the self-terminal (Step S2002). Each terminal can figure out the positional relationship between the self-terminal and the adjacent terminal of the self-terminal. Each terminal does not completely figure out the positional relationship between the adjacent terminal of the self-terminal and the other adjacent terminals. However, each terminal can figure out the positional relationship to some extent, as with the description of Step S1806 shown in FIG. 0.18. For example, each terminal can figure out whether or not the lower-rank terminal of the self-terminal is present in the lower rank of the same-rank terminal of the self-terminal. The controller 301 determines whether or not the lower-rank terminal of the self-terminal is in the lower rank of the same-rank terminal in Step S2001, thus determining whether or not the sleep-declaration terminal is included in the alternative path of the lower-rank terminal of the self-terminal.

When the controller 301 determines that the sleep-declaration terminal is not included in the alternative path of the lower-rank terminal of the self-terminal in Step S2002, the processing in Step S1908 is executed. In this case, the sleep-prohibition packet is not transmitted. Since the sleep-declaration terminal is not included in the communication path of the lower-rank terminal of the self-terminal, the lower-rank terminal of the self-terminal is not influenced by sleep by the sleep-declaration terminal. Therefore, the sleep-declaration terminal can go into the sleep state.

When the controller 301 determines that the sleep-declaration terminal is included in the alternative path of the lower-rank terminal of the self-terminal in Step S2002, the controller 301 determines whether or not the history of receiving the sleep-prohibition packet is present in the current wake-up state of the self-terminal (Step S2003). In a case in which the sleep-prohibition packet has not been received after starting the current wake-up state, the history of receiving the sleep-prohibition packet is not present in the current wake-up state. In a case in which the sleep-prohibition packet has been received after starting the current wake-up state, the history of receiving the sleep-prohibition packet is present in the current wake-up state.

When the controller 301 determines that the history of receiving the sleep-prohibition packet is not present in the current wake-up state in Step S2003, the processing in Step S1908 is executed. In this case, the sleep-prohibition packet is not transmitted. When the controller 301 determines that the history of receiving the sleep-prohibition packet is present in the current wake-up state in Step S2003, the controller 301 confirms the sleep time until the self-terminal next executes the processing of transmitting a data packet including the sensor data acquired from the sensor 303 (Step S2004). When the self-terminal receives the sleep-prohibition packet, the self-terminal can go into the sleep state. This means that a length of time until the sensor 303 next executes measurement is stored as the sleep time. The sleep time decreases as time passes. After the sleep time passes, the self-terminal executes predetermined processing such as data transmission. After the predetermined processing is executed, the self-terminal starts sleeping again. The self-terminal can predict the time point to start sleeping again on the basis of the sleep time confirmed in Step S2004.

After Step S2004, the controller 301 determines whether or not a scheduled time point for sleep at which the self-terminal starts sleeping is included in a period of the sleep time of the sleep-declaration terminal. Specifically, the controller 301 predicts the scheduled time point for sleep by the self-terminal on the basis of the sleep time of the self-terminal confirmed in Step S2004. The controller 301 calculates a scheduled time point for wake-up at which the sleep-declaration terminal stops sleeping by adding the scheduled sleep time included in the sleep-declaration packet to the time point at which the sleep-declaration packet is received. The controller 301 compares the scheduled time point for sleep by the self-terminal with the scheduled time point for wake-up by the sleep-declaration terminal. In a case in which the scheduled time point for sleep by the self-terminal is before the scheduled time point for wake-up by the sleep-declaration terminal, the scheduled time point for sleep by the self-terminal is included in the period of the sleep time of the sleep-declaration terminal. In a case in which the scheduled time point for sleep by the self-terminal is after the scheduled time point for wake-up by the sleep-declaration terminal, the scheduled time point for sleep by the self-terminal is not included in the period of the sleep time of the sleep-declaration terminal (Step S2005).

When the controller 301 determines that the scheduled time point for sleep by the self-terminal is not included in the period of the sleep time of the sleep-declaration terminal in Step S2005, the processing in Step S1908 is executed. In this case, the sleep-prohibition packet is not transmitted. Since the self-terminal goes into the sleep state after the sleep-declaration terminal wakes up, the lower-rank terminal of the self-terminal is not influenced by sleep by the sleep-declaration terminal. Therefore, the sleep-declaration terminal can go into the sleep state.

When the controller 301 determines that the scheduled time point for sleep by the self-terminal is included in the period of the sleep time of the sleep-declaration terminal in Step S2005, the processing in Step S1904 is executed. In Step S2003, it is revealed that the self-terminal has the history of losing the opportunity to sleep. In order to cause the self-terminal having the history of losing the sleep opportunity to next sleep with high priority, the sleep-prohibition packet is transmitted in Step S1904. When the self-terminal receives the sleep-declaration packet or the sleep-cancelation packet from the adjacent terminal, the self-terminal does not transfer the sleep-declaration packet or the sleep-cancelation packet. When the self-terminal receives the sleep-notification packet from the adjacent terminal, the self-terminal does not transfer the sleep-notification packet.

(Wake-Up-Notification-Transmission Processing)

Figure 21:
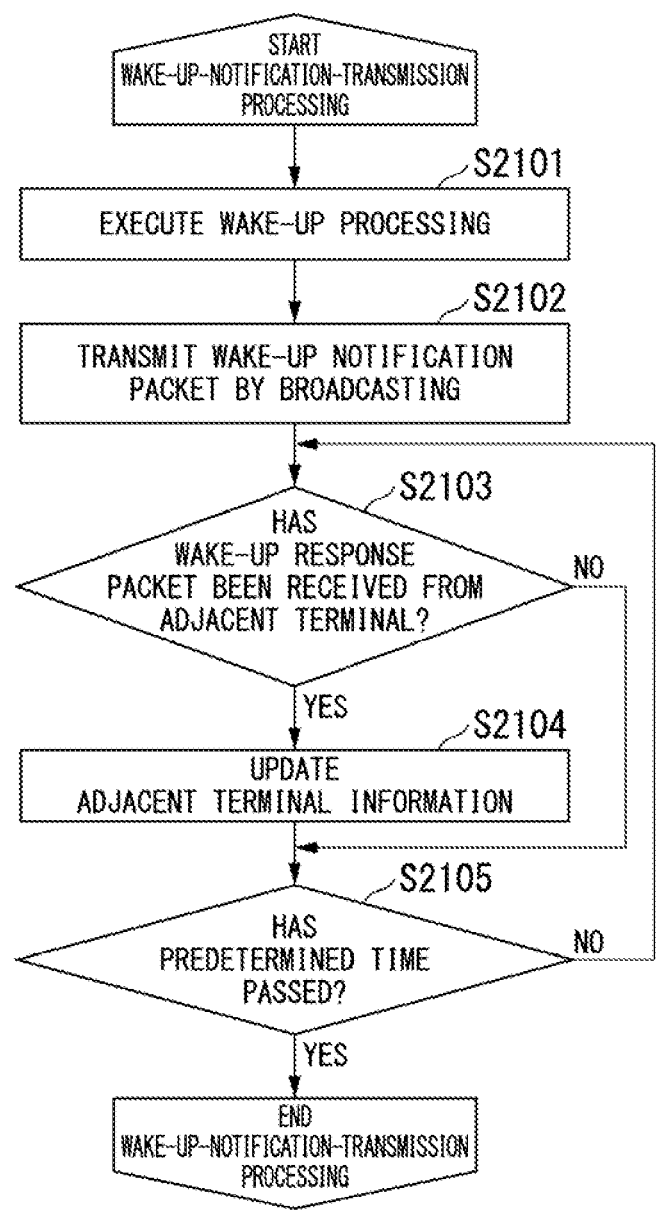
FIG. 21 is a flow chart showing a procedure of wake-up-notification-transmission processing executed by the terminal according to the embodiment of the present invention.

FIG. 21 shows a procedure of the wake-up-notification-transmission processing executed in Step S1503 shown in FIG. 15. The controller 301 executes wake-up processing. The controller 301 switches the state of the system of the self-terminal from the low power-consumption state to a normal operation state by starting the power supply to the sensor 303 and the communicator 302 in the wake-up processing (Step S2101).

After Step S2101, the controller 301 causes the communicator 302 to transmit the wake-up notification packet by broadcasting (Step S2102). After Step S2102, the controller 301 monitors the state of the communicator 302 and determines whether or not the communicator 302 has received the wake-up response packet from the adjacent terminal (Step S2103). When the controller 301 determines that the communicator 302 has not received the wake-up response packet in Step S2103, the processing in Step S2105 is executed. The processing in Step S2105 will be described later.

When the controller 301 determines that the communicator 302 has received the wake-up response packet in Step S2103, the controller 301 extracts the ID included in the wake-up response packet. The controller 301 searches the adjacent terminal information stored on the memory 304 for information including the extracted ID. The adjacent terminal transmitting the wake-up response packet is in the wake-up state. The controller 301 updates the state information associated with the found ID to the wake-up state (Step S2104).

After Step S2104, the controller 301 determines whether or not a predetermined time has passed since transmitting the wake-up notification packet (Step S2105). When the controller 301 determines that the predetermined time has not passed in Step S2105, the processing in Step S2103 is executed. When the controller 301 determines that the predetermined time has passed in Step S2105, the controller 301 completes the wake-up-notification-transmission processing.

(Wake-Up-Notification-Reception Processing)

Figure 22:
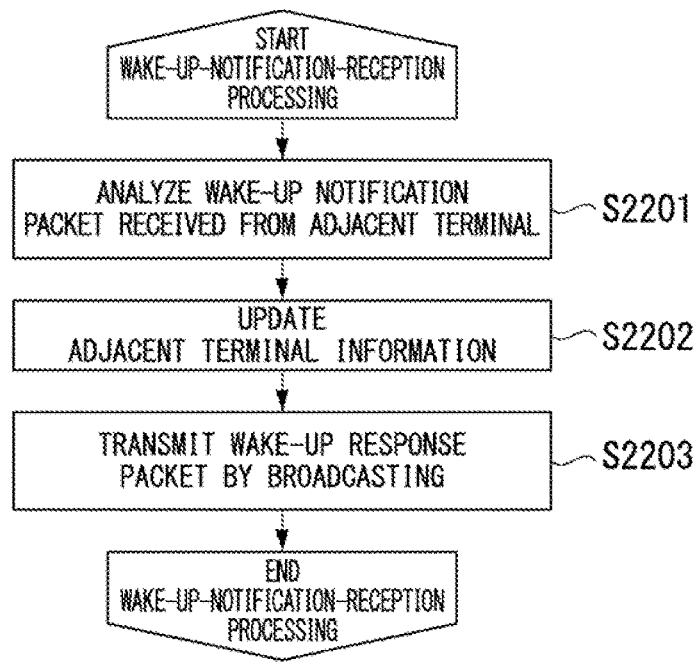
FIG. 22 is a flow chart showing a procedure of wake-up-notification-reception processing executed by the terminal according to the embodiment of the present invention.

FIG. 22 shows a procedure of the wake-up-notification-reception processing executed in Step S1603 shown in FIG. 16. The controller 301 analyzes the wake-up notification packet received from the adjacent terminal. Specifically, the controller 301 extracts the ID of the transmission source added to the wake-up notification packet and identifies the terminal that is the transmission source (Step S2201).

After Step S2201, the controller 301 searches the adjacent terminal information stored on the memory 304 for information including the extracted ID. The adjacent terminal transmitting the wake-up notification packet is in the wake-up state. The controller 301 updates the state information associated with the found ID to the wake-up state (Step S2202).

After Step S2202, the controller 301 causes the communicator 302 to transmit the wake-up response packet by broadcasting (Step S2203). When the processing in Step S2203 is executed, the controller 301 completes the wake-up-notification-reception processing. When the self-terminal receives the wake-up notification packet from the adjacent terminal, the self-terminal does not transfer the wake-up notification packet.

(Sleep-Time-Determination Processing)

Figure 23:
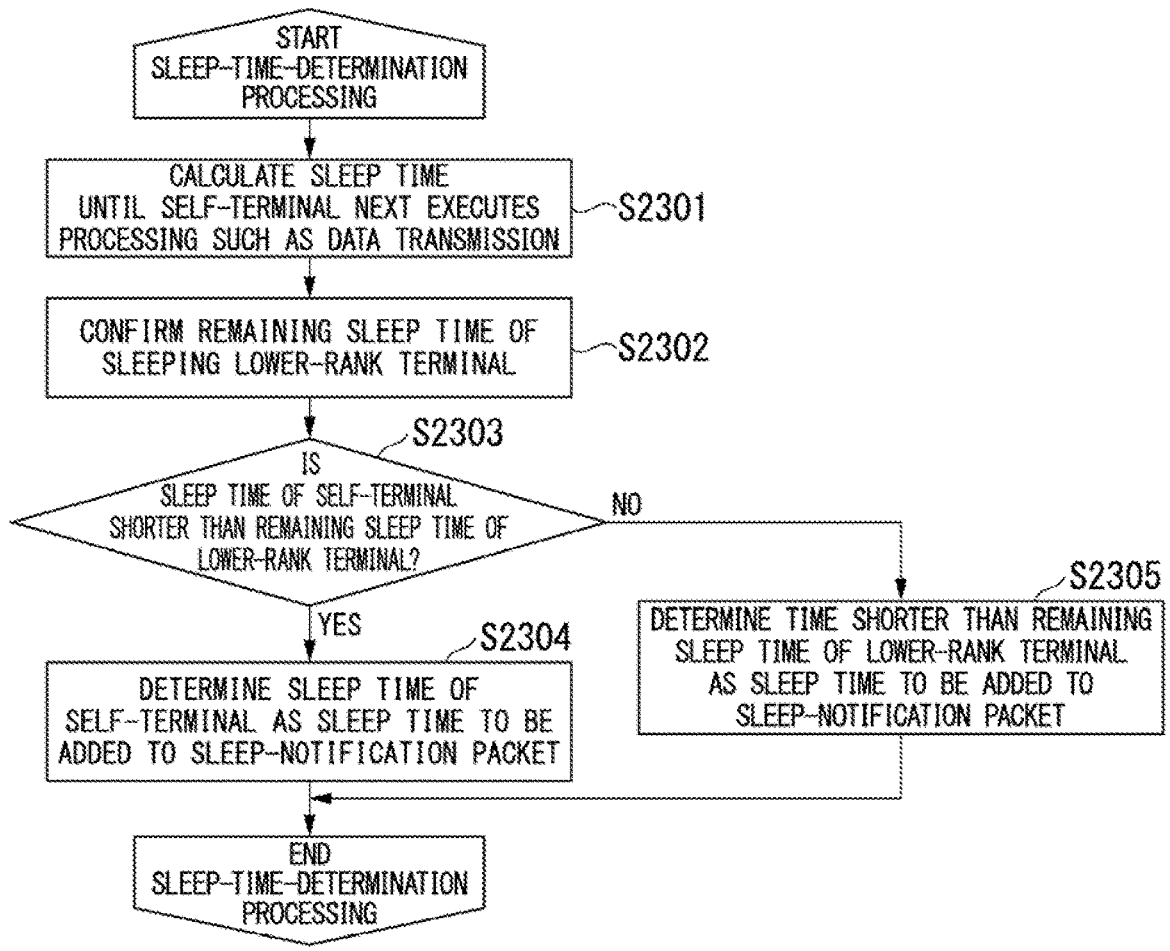
FIG. 23 is a flow chart showing a procedure of sleep-time-determination processing executed by the terminal according to the embodiment of the present invention.

FIG. 23 shows a procedure of the sleep-time-determination processing executed in Step S1809 shown in FIG. 18. The controller 301 confirms the time point at which the self-terminal next starts processing of transmitting a data packet including the sensor data acquired from the sensor 303. The controller 301 calculates the sleep time on the basis of the confirmed time point and the current time point (Step S2301). For example, the sleep time is the difference between the two time points.

After Step S2301, the controller 301 confirms the remaining sleep time of the sleeping lower-rank terminal on the basis of the adjacent terminal information stored on the memory 304. In Step S1906 shown in FIG. 19, the sleep time of the adjacent terminal declaring sleep is added to the adjacent terminal information. As described above, the sleep time decreases as time passes. When a plurality of lower-rank terminals are sleeping, the controller 301 selects the shortest remaining sleep time. In other words, the controller 301 selects the remaining sleep time of the sleeping lower-rank terminal that wakes up the earliest (Step S2302). When the sleeping lower-rank terminal is not present, the controller 301 does not select the sleep time.

After Step S2302, the controller 301 compares the sleep time of the self-terminal with the remaining sleep time of the lower-rank terminal. The controller 301 determines whether or not the sleep time of the self-terminal is shorter than the remaining sleep time of the lower-rank terminal (Step S2303).

When the controller 301 determines that the sleep time of the self-terminal is shorter than the remaining sleep time of the lower-rank terminal in Step S2303, the controller 301 determines the sleep time of the self-terminal as the sleep time to be added to the sleep-notification packet (Step S2304). For example, when the sleep time of the self-terminal is sixty minutes and the remaining sleep time of the lower-rank terminal is ninety minutes, sixty minutes are adopted as the sleep time. Also, in a case in which the controller 301 has not selected the sleep time in Step S2302, the processing in Step S2304 is executed.

Since the sleep time of the self-terminal is shorter than the remaining sleep time of the lower-rank terminal, the self-terminal wakes up before the lower-rank terminal wakes up. When the lower-rank terminal wakes up, the communication path of the lower-rank terminal has been secured.

When the controller 301 determines that the remaining sleep time of the lower-rank terminal is shorter than the sleep time of the self-terminal in Step S2303, the controller 301 determines the sleep time to be added to the sleep-notification packet on the basis of the remaining sleep time of the lower-rank terminal. For example, the controller 301 determines a period of time slightly shorter than the remaining sleep time of the lower-rank terminal as the sleep time to be added to the sleep-notification packet (Step S2305).

For example, in a case in which the sleep time of the self-terminal is sixty minutes and the remaining sleep time of the lower-rank terminal is ninety minutes, the self-terminal wakes up earlier than the lower-rank terminal. After sixty minutes passes from the current time point and the self-terminal transmits the sleep-notification packet again, the self-terminal determines the sleep time. In a case in which the self-terminal wakes up every sixty minutes, the sleep time of the self-terminal is set to be sixty minutes. Since sixty minutes have passed at the current time point, the remaining sleep time of the lower-rank terminal is thirty minutes. In this case, the remaining sleep time of the lower-rank terminal (thirty minutes) is adopted.

The self-terminal is required to wake up in a period shorter than the thirty minutes in order to secure the communication path of the lower-rank terminal. Therefore, in consideration of the period of time for processing such as the wake-up processing and the error of the internal clock of each terminal, the self-terminal wakes up at an earlier timing than the timing at which the lower-rank terminal wakes up. For example, there is an error in progress of the internal clock for each terminal. The error is not more than several milliseconds to ten-odd milliseconds. In addition, the processing time required for the system to wake up is considered to be not more than several seconds. For example, the controller 301 predicts the sum of the processing time required for the self-terminal to wake up and the error of the internal clock to be about ten seconds. When the remaining sleep time of the lower-rank terminal is thirty minutes, the controller 301 sets the sleep time of the self-terminal to be twenty-nine minutes fifty seconds.

When the processing in Step S2304 or Step S2305 is executed, the controller 301 completes the sleep-time-determination processing. The sleep time determined in Step S2304 or Step S2305 is added to the sleep-notification packet transmitted in Step S1810 shown in FIG. 18.
(Structure of Packet)

Figures 24, 25:
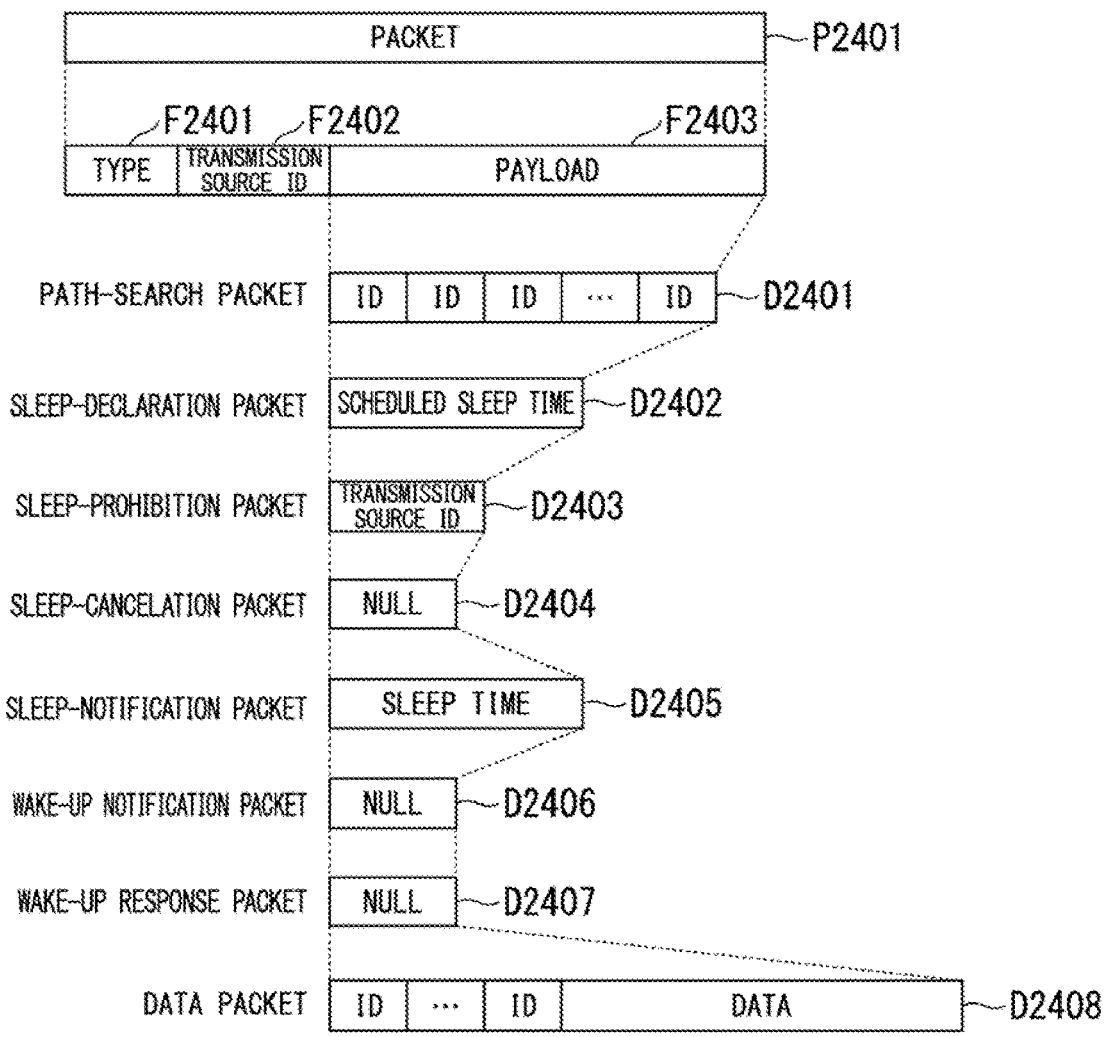
FIG. 24 is a diagram showing a packet structure in the embodiment of the present invention.
FIG. 25 is a diagram showing a packet-type code in the embodiment of the present invention.

FIG. 24 shows a structure of each packet used for communication. The packet P2401 includes a type F2401, a transmission source ID F2402, and a payload F2403. The type F2401 indicates the type of the packet. The transmission source ID F2402 is an ID that identifies the transmission source. The payload F2403 includes various kinds of information.

The type F2401 includes a value for each type shown in FIG. 25. The type of the packet is any one of the path search, the sleep declaration, the sleep prohibition, the sleep cancelation, the sleep notification, the wake-up notification, the wake-up response, and the data. Values different from each other for each type of the packet are prepared. The controller 301 extracts the type F2401 from the received packet. The controller 301 determines the type of the packet on the basis of the type F2401 and executes each piece of processing. The transmission source ID F2402 includes an ID such as 0001 used for describing the network N1 shown in FIG. 1

The format of the payload F2403 is different between types of packets. The ID is added to the path-search packet each time the packet is transferred. In the example shown in FIG. 24, the payload D2401 of the path-search packet includes one or more IDs. In a case in which the path-search packet includes a plurality of IDs, the order of these IDs is the same as the order of terminals on the communication path of the path-search packet.

For example, the path-search packet transmitted from the gateway G1 reaches the terminal 1. When the terminal 1 transmits the path-search packet, the terminal 1 adds the ID (0001) unique to the terminal 1 to the path-search packet. Similarly, the path-search packet transmitted from the terminal 1 reaches the terminal 2. When the terminal 2 transmits the path-search packet, the terminal 2 adds the ID (0002) unique to the terminal 2 to the path-search packet. The data sequence of the payload D2401 becomes "00010002." This data sequence becomes the communication-path information in its entirety. The number of IDs arranged from the head of the data becomes the hop number.

The payload D2402 of the sleep-declaration packet includes the scheduled sleep time. The scheduled sleep time may be indicated by a scheduled time point for starting sleeping and a scheduled time point for completing sleeping. The payload D2403 of the sleep-prohibition packet includes the transmission source ID of the terminal transmitting the sleep-declaration packet. "NULL" is written in the payload D2404 of the sleep-prohibition packet. This means that the payload D2404 of the sleep-prohibition packet does not include data.

The payload D2405 of the sleep-notification packet includes the sleep time. The sleep time may be indicated by the scheduled time point for starting sleeping and the scheduled time point for completing sleeping. "NULL" is written in the payload D2406 of the wake-up notification packet and the payload D2407 of the wake-up response packet. This means that the payload D2406 of the wake-up notification packet and the payload D2407 of the wake-up response packet do not include data. The payload D2408 of the data packet includes an ID and data. As with the path-search packet, the ID is added to the data packet each time the packet is transferred.
(Configuration of Adjacent Terminal Information)

FIG. 26A, FIG. 26B, and FIG. 26C show a configuration of the adjacent terminal information managed by each terminal. FIG. 26A shows a format of the adjacent terminal information. The adjacent terminal information includes information of each of an ID, the positional relationship, the terminal state, the sleep time, and the non-subordination relationship. The ID is unique to the adjacent terminal. The positional relationship indicates the hierarchical position of the adjacent terminal with respect to the self-terminal. The positional relationship indicates any one of the upper rank, the same rank, and the lower rank. The terminal state indicates any one of the wake-up state and the sleep state. When the adjacent terminal is sleeping, the sleep time is set. The non-subordination relationship means that the lower-rank terminal of the self-terminal is not positioned in the lower rank of the same-rank terminal of the self-terminal. The non-subordination relationship indicates the ID of the lower-rank terminal. The controller 301 updates the adjacent terminal information each time new information is obtained.

FIG. 26B shows an example of the information managed by the terminal 1 in the network N1 shown in FIG. 1. Since the terminal 3 is the lower-rank terminal of the terminal 1, the ID of 0003 and the information indicating the lower rank are associated with each other. When the terminal 3 is sleeping, the terminal state indicates sleep. The sleep time is ninety minutes. The sleep time decreases as time passes.

FIG. 26C shows an example of the information managed by the terminal 1 in the network N2 shown in FIG. 2. In the network N2, the terminal 2 and the terminal 3 are unable to directly communicate with each other. As with the description of FIG. 18, the terminal 1 understands that the terminal 3 is not present in the lower rank of the terminal 2 that is in the same rank as the terminal 1 by repeating the sequence of the sleep-declaration packet or the like. The non-subordination relationship of the ID of 0002 includes the ID of 0003.

The wireless communication method according to each aspect of the present invention includes a first step, a second step, a third step, a fourth step, and a fifth step. When the communicator 302 receives the path-search packet from a peripheral terminal, the controller 301 causes the communicator 302 to transmit the path-search packet to the adjacent terminal in the first step (S1703). The controller 301 determines the upper-rank terminal on the basis of the path-search packet received by the communicator 302 from the peripheral terminal in the second step (S1709). The controller 301 stores the state information of the adjacent terminal on the memory 304 on the basis of a notification received by the communicator 302 from the adjacent terminal in the third step (S1906, S2104, and S2202). When the communicator 302 receives the sleep-declaration packet from the sleep-declaration terminal and the sleep-declaration terminal is the upper-rank terminal, the controller 301 executes the first sleep determination on the basis of the state information in the fourth step (S1903). When the controller 301 determines that the sleep by the sleep-declaration terminal is not accepted, the controller 301 causes the communicator 302 to transmit the sleep-prohibition packet to the sleep-declaration terminal in the fifth step (S1904). The wireless communication method according to each aspect of the present invention does not need to include a step other than the above-described five steps.

If the upper-rank terminal in the wake-up state other than the sleep-declaration terminal is not present, the controller 301 determines that the sleep by the sleep-declaration terminal is not accepted in the first sleep determination. Therefore, each terminal can surely secure the communication path. If the upper-rank terminal in the wake-up state other than the sleep-declaration terminal is present, the controller 301 determines that the sleep by the sleep-declaration terminal is accepted in the first sleep determination. Therefore, each terminal can reduce the power consumption of the entire network. In the multi-hop network, each terminal can voluntarily execute the first sleep determination without being intensively managed.

The controller 301 causes the communicator 302 to transmit the sleep-declaration packet to the adjacent terminal in Step S1802. If the communicator 302 does not receive the sleep-prohibition packet from the adjacent terminal in a predetermined period after the communicator 302 transmits the sleep-declaration packet, the controller 301 causes the communicator 302 to transmit the sleep-notification packet to the adjacent terminal in Step S1810. After the communicator 302 transmits the sleep-notification packet, the controller 301 executes the sleep processing for changing the state of the self-terminal to the sleep state in which the power consumption is less than the power consumption in the wake-up state in Step S1812. After the sleep processing is executed, the controller 301 executes the wake-up processing for restoring the state of the self-terminal from the sleep state in Step S2101. After the wake-up processing is executed, the controller 301 causes the communicator 302 to transmit the wake-up notification packet to the adjacent terminal in Step S2102. The controller 301 stores the state information on the memory 304 in Step S1906 and Step S2202 on the basis of the sleep-notification packet received by the communicator 302 from the adjacent terminal and the wake-up notification packet received by the communicator 302 from the adjacent terminal.

Each wireless communication terminal can always figure out the wake-up state and the sleep state of the adjacent terminal of the self-terminal on the basis of the state information. Therefore, the wireless communication terminal that is in the state allowing the terminal to sleep and aims for an opportunity to sleep can immediately start the sleep processing.

The controller 301 determines the same-rank terminal on the basis of the path-search packet received by the communicator 302 from the peripheral terminal in Step S1709. The third number is the same as the fourth number. The third number is the number of wireless communication terminals that are present between the gateway G1 (integration device) and the self-terminal on the communication path. The fourth number is the number of wireless communication terminals that are present between the gateway G1 and the same-rank terminal on the communication path. In a first case in which the communicator 302 receives the sleep-prohibition packet from the adjacent terminal in a predetermined period and the state information of the sleeping same-rank terminal is stored on the memory 304, the controller 301 causes the communicator 302 to transmit the sleep-declaration packet to the adjacent terminal at a timing at which the sleeping same-rank terminal wakes up (Step S1802).

The sleep-declaration packet is transmitted in Step S1802. There is a case in which the sleep-prohibition packet is received from the adjacent terminal in a following predetermined period (Step S1805). The controller 301 can determine that the state of the sleeping same-rank terminal changes from the sleep state to the wake-up state in Step S1508. When the controller 301 determines that the state of the sleeping same-rank terminal changes from the sleep state to the wake-up state, the self-terminal can go into the sleep state (Step S1509). Therefore, the sleep-declaration-transmission processing (Step S1510) is executed and the sleep-declaration packet is transmitted again in Step S1802.

After the sleeping same-rank terminal wakes up, the self-terminal can go into the sleep state. Therefore, the load of the power consumption is dispersed among wireless communication terminals.

The sleep-notification packet includes period information (sleep time) related to the sleep period of the wireless communication terminal transmitting the sleep-notification packet. In the first case, the controller 301 may execute timing determination on the basis of the period information in Step S2004 and Step S2005 before the self-terminal next starts sleeping. The controller 301 determines whether or not the scheduled time point for wake-up by the sleeping same-rank terminal is earlier than the scheduled time point for sleep by the self-terminal in the timing determination. The scheduled time point for wake-up is the time point at which the same-rank terminal stops sleeping. The scheduled time point for sleep is the time point at which the self-terminal starts sleeping. When the controller 301 determines that the scheduled time point for wake-up by the same-rank terminal is earlier than the scheduled time point for sleep by the self-terminal, the controller 301 may cause the communicator 302 to transmit the sleep-declaration packet to the adjacent terminal at the scheduled time point for wake-up by the same-rank terminal (Step S1802).

The controller 301 predicts the scheduled time point for sleep at which the self-terminal starts sleeping in Step S2004. The controller 301 may predict the scheduled time point for wake-up by the sleeping same-rank terminal on the basis of the period information. The controller 301 can determine whether or not the self-terminal can go into the sleep state on the basis of the scheduled time point for wake-up by the sleeping same-rank terminal.

The sleep-declaration packet includes the period information (scheduled sleep time) related to the sleep period of the sleep-declaration terminal. The controller 301 determines the same-rank terminal on the basis of the path-search packet received by the communicator 302 from the peripheral terminal in Step S1709. In a case in which the communicator 302 receives the sleep-prohibition packet from the adjacent terminal in a predetermined period and the sleep-declaration terminal is the same-rank terminal, the controller 301 executes second sleep determination in Step S2005. The controller 301 determines whether or not there is a period in which the self-terminal and the sleep-declaration terminal are simultaneously sleeping on the basis of the scheduled time point for sleep by the self-terminal and the sleep period of the sleep-declaration terminal in the second sleep determination. The scheduled time point for sleep is the time point at which the self-terminal starts sleeping. When the controller 301 determines that there is the period in which the self-terminal and the sleep-declaration terminal are simultaneously sleeping, the controller 301 determines that the sleep by the sleep-declaration terminal is not accepted in the second sleep determination.

The controller 301 compares the scheduled time point for sleep by the self-terminal with the scheduled time point for wake-up by the sleep-declaration terminal in Step S2005. In a case in which the scheduled time point for sleep by the self-terminal is before the scheduled time point for wake-up by the sleep-declaration terminal, there is the period in which the self-terminal and the sleep-declaration terminal are simultaneously sleeping. In a case in which the scheduled time point for sleep by the self-terminal is after the scheduled time point for wake-up by the sleep-declaration terminal, there is not the period in which the self-terminal and the sleep-declaration terminal are simultaneously sleeping. When there is the period in which the self-terminal and the sleep-declaration terminal are simultaneously sleeping, the sleep-prohibition packet is transmitted in Step S1904.

When the sleep by the self-terminal is prohibited (Step S2003), it is determined whether or not the self-terminal and the sleep-declaration terminal simultaneously sleep (Step S2005). In a case in which the self-terminal and the sleep-declaration terminal simultaneously sleep, the sleep by the sleep-declaration terminal is prohibited. Therefore, the next sleep by the self-terminal is prioritized over the sleep by the sleep-declaration terminal.

The controller 301 determines the lower-rank terminal on the basis of the path-search packet received by the communicator 302 from the peripheral terminal in Step S1709. The fifth number is greater than the sixth number. The fifth number is the number of wireless communication terminals that are present between the gateway G1 (integration device) and the lower-rank terminal on the communication path. The sixth number is the number of wireless communication terminals that are present between the gateway G1 (integration device) and the self-terminal on the communication path. The controller 301 stores detour information (non-subordination relationship) that indicates whether or not the same-rank terminal is included in the communication path of the lower-rank terminal on the memory 304 in Step S1806. The controller 301 determines whether or not the sleep-declaration terminal is the same-rank terminal included in the communication path of the lower-rank terminal on the basis of the detour information in the second sleep determination (Step S2002). When the controller 301 determines that there is the period in which the self-terminal and the sleep-declaration terminal are simultaneously sleeping and the controller 301 determines that the sleep-declaration terminal is the same-rank terminal included in the communication path of the lower-rank terminal, the controller 301 determines that the sleep by the sleep-declaration terminal is not accepted in the second sleep determination.

When the self-terminal is sleeping, there is a possibility that the lower-rank terminal of the self-terminal performs communication by using only the alternative path including the same-rank terminal of the self-terminal. While the self-terminal and the sleep-declaration terminal are simultaneously sleeping, the lower-rank terminal is unable to perform communication. In such a case, the sleep by the sleep-declaration terminal is prohibited. Therefore, the power consumption is leveled as much as possible and the wasteful power consumption is reduced.

The controller 301 determines the lower-rank terminal on the basis of the path-search packet received by the communicator 302 from the peripheral terminal in Step S1709. The sleep-notification packet includes the period information (sleep time) related to the sleep period of the wireless communication terminal transmitting the sleep-notification packet. The controller 301 determines the scheduled time point for wake-up by the sleeping lower-rank terminal on the basis of the period information in Step S2302. The scheduled time point for wake-up is the time point at which the lower-rank terminal stops sleeping. In a second case in which the communicator 302 does not receive the sleep-prohibition packet from the adjacent terminal in a predetermined period and the state information of the sleeping lower-rank terminal is stored on the memory 304, the controller 301 determines the sleep period of the self-terminal in Step S2304 or Step S2305. The sleep period of the self-terminal is completed before the scheduled time point for wake-up by the sleeping lower-rank terminal.

The self-terminal wakes up before the lower-rank terminal wakes up. Therefore, the communication path of the lower-rank terminal is surely secured and the power consumption of the self-terminal is reduced.

The controller 301 determines the scheduled sleep period (sleep time) of the self-terminal in Step S2301. In the second case and in a third case in which the scheduled sleep period is completed after the scheduled time point for wake-up by the lower-rank terminal, the controller 301 determines the sleep period of the self-terminal in Step S2305. The sleep-notification packet transmitted by the communicator 302 includes the period information related to the sleep period of the self-terminal.

The controller 301 determines whether or not the sleep time of the self-terminal is shorter than the remaining sleep time of the lower-rank terminal in Step S2303. In a case in which the sleep time of the self-terminal is not shorter than the remaining sleep time of the lower-rank terminal, the scheduled sleep period of the self-terminal is completed after the scheduled time point for wake-up by the lower-rank terminal. Since the self-terminal is sleeping when the lower-rank terminal wakes up, the communication path of the lower-rank terminal is not secured. In such a case, the sleep period of the self-terminal is determined in Step S2305. The sleep period is completed before the lower-rank terminal wakes up. In other words, the self-terminal wakes up before the lower-rank terminal wakes up. Therefore, the communication path of the lower-rank terminal is surely secured and the power consumption of the self-terminal is reduced.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal in a wireless communication system, the wireless communication terminal comprising:

a wireless communicator;

a memory; and a processor, wherein the wireless communication system includes an integration device and two or more of the wireless communication terminals, in a case in which one of the two or more of the wireless communication terminals is defined as a self-terminal:
  the processor of the self-terminal is configured to cause the wireless communicator to transmit a path-search packet including communication-path information to an adjacent terminal when the wireless communicator receives the path-search packet from a peripheral terminal, the communication-path information indicating a communication path of the path-search packet, the peripheral terminal being any one of the integration device and the adjacent terminal, the adjacent terminal being a wireless communication terminal that is included in the two or more of the wireless communication terminals and is adjacent to the self-terminal on the communication path;
  the processor of the self-terminal is configured to determine an upper-rank terminal on the basis of the path-search packet received by the wireless communicator from the peripheral terminal,
  wherein the upper-rank terminal is the adjacent terminal and a first number is less than a second number, the first number is a number of wireless communication terminals that are included in the two or more of the wireless communication terminals and are present between the integration device and the upper-rank terminal on the communication path, and the second number is a number of wireless communication terminals that are included in the two or more of the wireless communication terminals and are present between the integration device and the self-terminal on the communication path;
  the processor of the self-terminal is configured to store state information of the adjacent terminal on the memory on the basis of a notification received by the wireless communicator from the adjacent terminal, the state information indicating any one of a sleep state and a wake-up state;
  the processor of the self-terminal is configured to execute first sleep determination on the basis of the state information when the wireless communicator receives a sleep-declaration packet from a sleep-declaration terminal and the sleep-declaration terminal is the upper-rank terminal, the sleep-declaration terminal being the adjacent terminal that has transmitted the sleep-declaration packet;
  the processor of the self-terminal is configured to determine that sleep by the sleep-declaration terminal is accepted in the first sleep determination if the upper-rank terminal in the wake-up state other than the sleep-declaration terminal is present;
  the processor of the self-terminal is configured to determine that the sleep by the sleep-declaration terminal is not accepted in the first sleep determination if the upper-rank terminal in the wake-up state other than the sleep-declaration terminal is not present; and
  the processor of the self-terminal is configured to cause the wireless communicator to transmit a sleep-prohibition packet to the sleep-declaration terminal when the processor of the self-terminal determines that the sleep by the sleep-declaration terminal is not accepted.

2. The wireless communication terminal according to claim 1,
  wherein the processor of the self-terminal is configured to cause the wireless communicator to transmit the sleep-declaration packet to the adjacent terminal when the self-terminal is in the wake-up state,
  the processor of the self-terminal is configured to cause the wireless communicator to transmit a sleep-notification packet to the adjacent terminal if the wireless communicator does not receive the sleep-prohibition packet from the adjacent terminal in a predetermined period after the wireless communicator transmits the sleep-declaration packet,
  the processor of the self-terminal is configured to execute sleep processing for changing a state of the self-terminal to the sleep state in which power consumption is less than power consumption in the wake-up state after the wireless communicator transmits the sleep-notification packet,
  the processor of the self-terminal is configured to execute wake-up processing for changing the state of the self-terminal from the sleep state to the wake-up state after the sleep processing is executed,
  the processor of the self-terminal is configured to cause the wireless communicator to transmit a wake-up notification packet to the adjacent terminal after the wake-up processing is executed, and
  the processor of the self-terminal is configured to store the state information on the memory on the basis of the sleep-notification packet received by the wireless communicator from the adjacent terminal and the wake-up notification packet received by the wireless communicator from the adjacent terminal.

3. The wireless communication terminal according to claim 2,
  wherein the processor of the self-terminal is configured to determine a same-rank terminal on the basis of the path-search packet received by the wireless communicator from the peripheral terminal,
    wherein a third number is the same as a fourth number, the third number is a number of wireless communication terminals that are included in the two or more of the wireless communication terminals and are present between the integration device and the self-terminal on the communication path, and the fourth number is a number of wireless communication terminals that are included in the two or more of the wireless communication terminals and are present between the integration device and the same-rank terminal on the communication path, and
  the processor of the self-terminal is configured to cause the wireless communicator to transmit the sleep-declaration packet to the adjacent terminal at a timing at which the sleeping same-rank terminal wakes up in a first case, in which the wireless communicator receives the sleep-prohibition packet from the adjacent terminal in the predetermined period and the state information of the sleeping same-rank terminal is stored on the memory.

4. The wireless communication terminal according to claim 3,
  wherein the sleep-notification packet includes period information related to a sleep period in which a wireless communication terminal that is included in the two or more of the wireless communication terminals and transmits the sleep-notification packet sleeps, in the first case, the processor of the self-terminal is configured to execute timing determination on the basis of the period information before the self-terminal next starts sleeping, the processor of the self-terminal is configured to determine whether or not a scheduled time point for wake-up by the sleeping same-rank terminal is earlier than a scheduled time point for sleep in the timing determination, the scheduled time point for wake-up being a time point at which the same-rank terminal stops sleeping, the scheduled time point for sleep being a time point at which the self-terminal starts sleeping, and the processor of the self-terminal is configured to cause the wireless communicator to transmit the sleep-declaration packet to the adjacent terminal at the scheduled time point for wake-up when the processor of the self-terminal determines that the scheduled time point for wake-up is earlier than the scheduled time point for sleep.

5. The wireless communication terminal according to claim 2, wherein the sleep-declaration packet includes period information related to a sleep period in which the sleep-declaration terminal sleeps, the processor of the self-terminal is configured to determine a same-rank terminal on the basis of the path-search packet received by the wireless communicator from the peripheral terminal, wherein a third number is the same as a fourth number, the third number is a number of wireless communication terminals that are included in the two or more of the wireless communication terminals and are present between the integration device and the self-terminal on the communication path, and the fourth number is a number of wireless communication terminals that are included in the two or more of the wireless communication terminals and are present between the integration device and the same-rank terminal on the communication path, the processor of the self-terminal is configured to execute second sleep determination in a case in which the wireless communicator receives the sleep-prohibition packet from the adjacent terminal in the predetermined period and the sleep-declaration terminal is the same-rank terminal, the processor of the self-terminal is configured to determine whether or not there is a period in which the self-terminal and the sleep-declaration terminal are simultaneously sleeping on the basis of a scheduled time point for sleep by the self-terminal and the sleep period of the sleep-declaration terminal in the second sleep determination, the scheduled time point for sleep being a time point at which the self-terminal starts sleeping, and the processor of the self-terminal is configured to determine that the sleep by the sleep-declaration terminal is not accepted in the second sleep determination when the processor of the self-terminal determines that there is the period in which the self-terminal and the sleep-declaration terminal are simultaneously sleeping.

6. The wireless communication terminal according to claim 5, wherein the processor of the self-terminal is configured to determine a lower-rank terminal on the basis of the path-search packet received by the wireless communicator from the peripheral terminal, wherein a fifth number is greater than a sixth number, the fifth number is a number of wireless communication terminals that are included in the two or more of the wireless communication terminals and are present between the integration device and the lower-rank terminal on the communication path, and the sixth number is a number of wireless communication terminals that are included in the two or more of the wireless communication terminals and are present between the integration device and the self-terminal on the communication path, the processor of the self-terminal is configured to store detour information that indicates whether or not the same-rank terminal is included in the communication path of the lower-rank terminal on the memory, the processor of the self-terminal is configured to determine whether or not the sleep-declaration terminal is the same-rank terminal included in the communication path of the lower-rank terminal on the basis of the detour information in the second sleep determination, and the processor of the self-terminal is configured to determine that the sleep by the sleep-declaration terminal is not accepted in the second sleep determination when the processor of the self-terminal determines that there is the period in which the self-terminal and the sleep-declaration terminal are simultaneously sleeping and the processor of the self-terminal determines that the sleep-declaration terminal is the same-rank terminal included in the communication path of the lower-rank terminal.

7. The wireless communication terminal according to claim 2, wherein the processor of the self-terminal is configured to determine a lower-rank terminal on the basis of the path-search packet received by the wireless communicator from the peripheral terminal, wherein a fifth number is greater than a sixth number, the fifth number is a number of wireless communication terminals that are included in the two or more of the wireless communication terminals and are present between the integration device and the lower-rank terminal on the communication path, and the sixth number is a number of wireless communication terminals that are included in the two or more of the wireless communication terminals and are present between the integration device and the self-terminal on the communication path, the sleep-notification packet includes period information related to a sleep period in which a wireless communication terminal that is included in the two or more of the wireless communication terminals and transmits the sleep-notification packet sleeps, the processor of the self-terminal is configured to determine a scheduled time point for wake-up by the sleeping lower-rank terminal on the basis of the period information, the scheduled time point for wake-up being a time point at which the lower-rank terminal stops sleeping, and the processor of the self-terminal is configured to determine a sleep period in which the self-terminal sleeps, in a second case in which the wireless communicator does not receive the sleep-prohibition packet from the adjacent terminal in the predetermined period and the state information of the sleeping lower-rank terminal is stored on the memory, the sleep period of the self-terminal being completed before the scheduled time point for wake-up by the sleeping lower-rank terminal.

8. The wireless communication terminal according to claim 7,
wherein the processor of the self-terminal is configured to determine a scheduled sleep period in which the self-terminal is scheduled to sleep,
the processor of the self-terminal is configured to determine the sleep period of the self-terminal in the second case and in a third case in which the scheduled sleep period is completed after the scheduled time point for wake-up by the lower-rank terminal, and
the sleep-notification packet transmitted by the wireless communicator includes the period information related to the sleep period of the self-terminal.

9. A wireless communication system, comprising:
an integration device; and
two or more wireless communication terminals,
wherein each of the two or more wireless communication terminal includes:
a wireless communicator;
a memory; and
a processor,
in a case in which one of the two or more of the wireless communication terminals is defined as a self-terminal:
the processor of the self-terminal is configured to cause the wireless communicator to transmit a path-search packet including communication-path information to an adjacent terminal when the wireless communicator receives the path-search packet from a peripheral terminal, the communication-path information indicating a communication path of the path-search packet, the peripheral terminal being any one of the integration device and the adjacent terminal, the adjacent terminal being a wireless communication terminal that is included in the two or more of the wireless communication terminals and is adjacent to the self-terminal on the communication path;
the processor of the self-terminal is configured to determine an upper-rank terminal on the basis of the path-search packet received by the wireless communicator from the peripheral terminal,
wherein the upper-rank terminal is the adjacent terminal and a first number is less than a second number, the first number is a number of wireless communication terminals that are included in the two or more of the wireless communication terminals and are present between the integration device and the upper-rank terminal on the communication path, and the second number is a number of wireless communication terminals that are included in the two or more of the wireless communication terminals and are present between the integration device and the self-terminal on the communication path;
the processor of the self-terminal is configured to store state information of the adjacent terminal on the memory on the basis of a notification received by the wireless communicator from the adjacent terminal, the state information indicating any one of a sleep state and a wake-up state;
the processor of the self-terminal is configured to execute first sleep determination on the basis of the state information when the wireless communicator receives a sleep-declaration packet from a sleep-declaration terminal and the sleep-declaration terminal is the upper-rank terminal, the sleep-declaration terminal being the adjacent terminal that has transmitted the sleep-declaration packet;
the processor of the self-terminal is configured to determine that sleep by the sleep-declaration terminal is accepted in the first sleep determination if the upper-rank terminal in the wake-up state other than the sleep-declaration terminal is present;
the processor of the self-terminal is configured to determine that the sleep by the sleep-declaration terminal is not accepted in the first sleep determination if the upper-rank terminal in the wake-up state other than the sleep-declaration terminal is not present; and
the processor of the self-terminal is configured to cause the wireless communicator to transmit a sleep-prohibition packet to the sleep-declaration terminal when the processor of the self-terminal determines that the sleep by the sleep-declaration terminal is not accepted.

10. A wireless communication method executed by a processor of a wireless communication terminal in a wireless communication system,
wherein the wireless communication system includes an integration device and two or more of the wireless communication terminals,
the wireless communication terminal includes a wireless communicator, a memory, and the processor,
in a case in which one of the two or more of the wireless communication terminals is defined as a self-terminal, the wireless communication method comprises:
a first step in which the processor of the self-terminal causes the wireless communicator to transmit a path-search packet including communication-path information to an adjacent terminal when the wireless communicator receives the path-search packet from a peripheral terminal, the communication-path information indicating a communication path of the path-search packet, the peripheral terminal being any one of the integration device and the adjacent terminal, the adjacent terminal being a wireless communication terminal that is included in the two or more of the wireless communication terminals and is adjacent to the self-terminal on the communication path;
a second step in which the processor of the self-terminal determines an upper-rank terminal on the basis of the path-search packet received by the wireless communicator from the peripheral terminal,
wherein the upper-rank terminal is the adjacent terminal and a first number is less than a second number, the first number is a number of wireless communication terminals that are included in the two or more of the wireless communication terminals and are present between the integration device and the upper-rank terminal on the communication path, and the second number is a number of wireless communication terminals that are included in the two or more of the wireless communication terminals and are present between the integration device and the self-terminal on the communication path;
a third step in which the processor of the self-terminal stores state information of the adjacent terminal on the memory on the basis of a notification received by the wireless communicator from the adjacent terminal, the state information indicating any one of a sleep state and a wake-up state;

a fourth step in which the processor of the self-terminal executes first sleep determination on the basis of the state information when the wireless communicator receives a sleep-declaration packet from a sleep-declaration terminal and the sleep-declaration terminal is the upper-rank terminal, the sleep-declaration terminal being the adjacent terminal that has transmitted the sleep-declaration packet, wherein the processor of the self-terminal determines that sleep by the sleep-declaration terminal is accepted in the first sleep determination if the upper-rank terminal in the wake-up state other than the sleep-declaration terminal is present, wherein the processor of the self-terminal determines that the sleep by the sleep-declaration terminal is not accepted in the first sleep determination if the upper-rank terminal in the wake-up state other than the sleep-declaration terminal is not present; and a fifth step in which the processor of the self-terminal causes the wireless communicator to transmit a sleep-prohibition packet to the sleep-declaration terminal when the processor of the self-terminal determines that the sleep by the sleep-declaration terminal is not accepted.

11. A non-transitory computer-readable recording medium saving a program for causing a processor of a wireless communication terminal in a wireless communication system to execute processing, wherein the wireless communication system includes an integration device and two or more of the wireless communication terminals, the wireless communication terminal includes a wireless communicator, a memory, and the processor, in a case in which one of the two or more of the wireless communication terminals is defined as a self-terminal, the program causes the processor of the self-terminal to execute:

a first step in which the processor of the self-terminal causes the wireless communicator to transmit a path-search packet including communication-path information to an adjacent terminal when the wireless communicator receives the path-search packet from a peripheral terminal, the communication-path information indicating a communication path of the path-search packet, the peripheral terminal being any one of the integration device and the adjacent terminal, the adjacent terminal being a wireless communication terminal that is included in the two or more of the wireless communication terminals and is adjacent to the self-terminal on the communication path;

a second step in which the processor of the self-terminal determines an upper-rank terminal on the basis of the path-search packet received by the wireless communicator from the peripheral terminal, wherein the upper-rank terminal is the adjacent terminal and a first number is less than a second number, the first number is a number of wireless communication terminals that are included in the two or more of the wireless communication terminals and are present between the integration device and the upper-rank terminal on the communication path, and the second number is a number of wireless communication terminals that are included in the two or more of the wireless communication terminals and are present between the integration device and the self-terminal on the communication path;

a third step in which the processor of the self-terminal stores state information of the adjacent terminal on the memory on the basis of a notification received by the wireless communicator from the adjacent terminal, the state information indicating any one of a sleep state and a wake-up state;

a fourth step in which the processor of the self-terminal executes first sleep determination on the basis of the state information when the wireless communicator receives a sleep-declaration packet from a sleep-declaration terminal and the sleep-declaration terminal is the upper-rank terminal, the sleep-declaration terminal being the adjacent terminal that has transmitted the sleep-declaration packet, wherein the processor of the self-terminal determines that sleep by the sleep-declaration terminal is accepted in the first sleep determination if the upper-rank terminal in the wake-up state other than the sleep-declaration terminal is present, wherein the processor of the self-terminal determines that the sleep by the sleep-declaration terminal is not accepted in the first sleep determination if the upper-rank terminal in the wake-up state other than the sleep-declaration terminal is not present; and a fifth step in which the processor of the self-terminal causes the wireless communicator to transmit a sleep-prohibition packet to the sleep-declaration terminal when the processor of the self-terminal determines that the sleep by the sleep-declaration terminal is not accepted.

* * * * *